US012627157B2

(12) United States Patent
Alowaidh et al.

(10) Patent No.: US 12,627,157 B2
(45) Date of Patent: May 12, 2026

(54) MULTI-SITE OPTIMIZATION OF ENERGY SYSTEMS

(71) Applicant: Saudi Arabian Oil Company, Dhahran (SA)

(72) Inventors: Mana M. Alowaidh, Dhahran (SA); Abdulrahman M. Hazazi, Dammam (SA); Solomon C. Oji, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 327 days.

(21) Appl. No.: 18/348,885

(22) Filed: Jul. 7, 2023

(65) Prior Publication Data

US 2025/0015601 A1     Jan. 9, 2025

(51) Int. Cl.
| | |
|---|---|
| *H02J 3/46* | (2006.01) |
| *H02J 3/14* | (2006.01) |
| *H02J 13/00* | (2006.01) |

(52) U.S. Cl.
CPC .................................... *H02J 3/46* (2013.01); *H02J 3/14* (2013.01); *H02J 13/00001* (2020.01); *H02J 2310/12* (2020.01)

(58) Field of Classification Search
CPC .......... G06Q 50/06; G06Q 10/04; F02C 9/28; G05B 13/048; G05B 2219/2639;
(Continued)

(56) References Cited

U.S. PATENT DOCUMENTS

| | | | | |
|---|---|---|---|---|
| 4,069,675 A | * | 1/1978 | Adler ........................ | F01K 3/24 |
| | | | | 122/448.3 |
| 4,628,462 A | | 12/1986 | Putman | |

(Continued)

FOREIGN PATENT DOCUMENTS

| | | |
|---|---|---|
| WO | WO 2016020164 | 2/2016 |
| WO | WO 2016114736 | 7/2016 |

OTHER PUBLICATIONS

Olama et al., "An Energy Signature Scheme for Steam Trap Assessment and Flow Rate Estimation Using Pipe-Induced Acoustic Measurements," Proceedings of SPIE—The International Society for Optical Engineering, May 2012, 8366:1-8, 8 pages.
(Continued)

*Primary Examiner* — Darrin D Dunn
(74) *Attorney, Agent, or Firm* — Fish & Richardson P.C.

(57) ABSTRACT

This disclosure describes methods and systems for optimizing operation of industrial steam and power utility systems across multiple facilities. A method involves: for each energy system at each facility: (a) performing equipment level data validation for the plurality of respective power generation equipment, (b) performing equipment level data reconciliation for the plurality of respective power generation equipment, (c) performing site-level optimization to determine equipment operating parameters for the plurality of respective power generation equipment; determining: (i) site-level constraints for the plurality of energy systems, and (ii) multi-site constraints across the plurality of energy systems; optimizing, based on the site-level constraints and the multi-site constraints, the equipment operating parameters for the plurality of respective power generation equipment across the plurality of energy systems.

20 Claims, 19 Drawing Sheets

(58) Field of Classification Search

CPC .. G05B 13/041; G05B 13/042; G05B 19/418;
Y02E 20/16; Y02E 40/70; F01K 13/00;
F01K 13/02; F23N 2223/44

See application file for complete search history.

(56) References Cited

U.S. PATENT DOCUMENTS

| | | | |
|---|---|---|---|
| 6,681,155 B1* | 1/2004 | Fujita | H02J 3/38 |
| | | | 60/660 |
| 6,785,592 B1 | 8/2004 | Smith et al. | |
| 7,039,575 B2 | 5/2006 | Juneau | |
| 7,222,111 B1 | 5/2007 | Budike, Jr. | |
| 8,798,798 B2 | 8/2014 | Ecock et al. | |
| 9,335,748 B2 | 5/2016 | Francino et al. | |
| 9,436,168 B2 | 9/2016 | Yasni | |
| 9,612,635 B2 | 4/2017 | Noureldin et al. | |
| 9,734,479 B2 | 8/2017 | Schmitt et al. | |
| 9,760,099 B2 | 9/2017 | Noureldin et al. | |
| 11,713,847 B2 | 8/2023 | Judd et al. | |
| 2004/0102924 A1 | 5/2004 | Jang | |
| 2007/0150333 A1 | 6/2007 | Hurst et al. | |
| 2008/0208429 A1 | 8/2008 | Jarrell et al. | |
| 2009/0012653 A1* | 1/2009 | Cheng | F23N 5/242 |
| | | | 700/287 |
| 2010/0030547 A1* | 2/2010 | Noureldin | F22B 33/00 |
| | | | 703/18 |
| 2013/0006429 A1* | 1/2013 | Shanmugam | F02C 9/42 |
| | | | 700/286 |
| 2013/0245844 A1 | 9/2013 | Noureldin et al. | |
| 2015/0184549 A1 | 7/2015 | Pamujula et al. | |
| 2015/0275688 A1 | 10/2015 | Barenbrugge et al. | |
| 2016/0258363 A1* | 9/2016 | Tiwari | F02C 9/42 |
| 2016/0281607 A1* | 9/2016 | Asati | F02C 7/26 |
| 2017/0364043 A1* | 12/2017 | Ganti | G05B 17/02 |
| 2019/0072920 A1 | 3/2019 | Ali et al. | |
| 2021/0108539 A1 | 4/2021 | Saravanapriyan et al. | |
| 2021/0224708 A1 | 7/2021 | Le et al. | |
| 2022/0011730 A1 | 1/2022 | Langenstein et al. | |
| 2022/0215138 A1 | 7/2022 | Amthor et al. | |
| 2023/0147522 A1 | 5/2023 | Alanazi et al. | |
| 2023/0288891 A1 | 9/2023 | Alowaidh et al. | |
| 2025/0110456 A1* | 4/2025 | Amminudin | G06Q 10/04 |

OTHER PUBLICATIONS

PCT International Search Report and Written Opinion in International Appln. No. PCT/US2024/036578, mailed on Sep. 19, 2024, 13 pages.

Pham et al., "Numerical analysis of direct contact condensation-induced water hammering effect using OpenFOAM in realistic steam pipes," International Journal of Heat and Mass Transfer, Jun. 2021, 171(121099):1-14, 14 pages.

Sun et al., "The water hammer in the long-distance steam supply pipeline: a computational fluid dynamics simulation," Cogent Engineering, 2022, 9(2127472):1-17, 17 pages.

U.S. Appl. No. 18/779,464, Alowaidh et al., Real-Time Advisory System and Method for Steam Distribution Network Operation, filed Jul. 22, 2024, 48 pages.

PCT International Search Report and Written Opinion in International Appln No. PCT/US2023/014698, dated Aug. 17, 2023, 13 pages.

* cited by examiner

1400

Cogeneration Fleets Optimum Load Management

☒ Base Case No. Units     ☐ Running Units - Optimized     ⊞ Max. No. Unit

1500

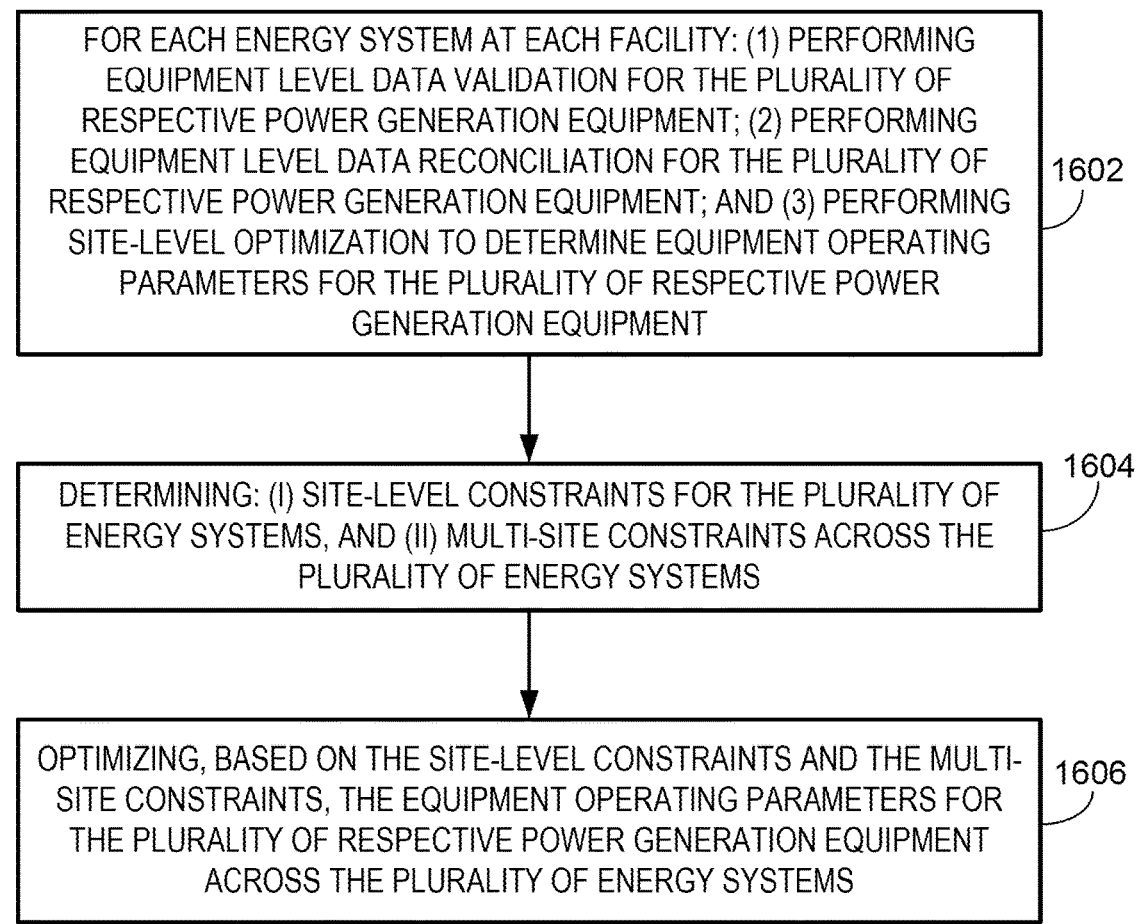

1600

FOR EACH ENERGY SYSTEM AT EACH FACILITY: (1) PERFORMING EQUIPMENT LEVEL DATA VALIDATION FOR THE PLURALITY OF RESPECTIVE POWER GENERATION EQUIPMENT; (2) PERFORMING EQUIPMENT LEVEL DATA RECONCILIATION FOR THE PLURALITY OF RESPECTIVE POWER GENERATION EQUIPMENT; AND (3) PERFORMING SITE-LEVEL OPTIMIZATION TO DETERMINE EQUIPMENT OPERATING PARAMETERS FOR THE PLURALITY OF RESPECTIVE POWER GENERATION EQUIPMENT

1602

DETERMINING: (I) SITE-LEVEL CONSTRAINTS FOR THE PLURALITY OF ENERGY SYSTEMS, AND (II) MULTI-SITE CONSTRAINTS ACROSS THE PLURALITY OF ENERGY SYSTEMS

1604

OPTIMIZING, BASED ON THE SITE-LEVEL CONSTRAINTS AND THE MULTI-SITE CONSTRAINTS, THE EQUIPMENT OPERATING PARAMETERS FOR THE PLURALITY OF RESPECTIVE POWER GENERATION EQUIPMENT ACROSS THE PLURALITY OF ENERGY SYSTEMS

MULTI-SITE OPTIMIZATION OF ENERGY SYSTEMS

TECHNICAL FIELD

This disclosure relates to computer-implemented methods, computer-readable media and computer systems implementing multi-site energy management, particularly energy management of industrial steam, power and utility systems across multiple facilities.

BACKGROUND

In industrial operations, e.g., industrial steam power and utility systems, different types of processes consume multiple steam levels, electricity and other forms of energy to obtain an output result, or to produce a required product or compound. For large-scale processes that consume significant amounts of steam, efficiencies can be achieved by optimizing the consumption of energy through careful operation, design or reconfiguration of the plant and the equipment used. Accurate and timely measurement of operational parameters of each equipment in the plant can enable such optimization.

SUMMARY

This disclosure describes computer-implemented methods, computer-readable media and computer systems that can optimize operation of industrial steam and power utility systems.

One aspect of the subject matter described in this specification may be embodied in a method that involves for each energy system at each facility: (a) performing equipment level data validation for the plurality of respective power generation equipment, (b) performing equipment level data reconciliation for the plurality of respective power generation equipment, (c) performing site-level optimization to determine equipment operating parameters for the plurality of respective power generation equipment; determining: (i) site-level constraints for the plurality of energy systems, and (ii) multi-site constraints across the plurality of energy systems; optimizing, based on the site-level constraints and the multi-site constraints, the equipment operating parameters for the plurality of respective power generation equipment across the plurality of energy systems.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the plurality of energy systems include an industrial plant, a power generation plant, and a renewable energy plant.

In some implementations, the site-level constraints include energy demands of each energy system, a respective steam reserve for each energy system, a respective minimum number of boilers needed to maintain the respective steam reserve for each energy system, and equipment limitations of the plurality of respective power generation equipment for each energy system.

In some implementations, the multi-site constraints include a steam reserve requirement across the plurality of energy systems, a power reserve requirement across the plurality of energy systems, an emission reduction target across the plurality of energy systems, and a minimum efficiency across the plurality of energy systems.

In some implementations, performing equipment level data validation for the plurality of respective power generation equipment involves: for each equipment of the plurality of power; generation equipment: receiving, during operation of each equipment, measured operational physical parameter values output by the equipment during the operation of the equipment; determining, using the received operational physical parameter values, mass balance and energy balance parameters associated with the equipment; and validating an operation of the equipment using the determined mass balance and energy balance parameters.

In some implementations, optimizing, based on the site-level constraints and the multi-site constraints, the equipment operating parameters for the plurality of respective power generation equipment involves generating a global matrix that comprises site-level optimization results of each energy system; and using a global objective function and the global matrix of site-level optimization results to optimize the equipment operating parameters for the plurality of respective power generation equipment.

In some implementations, the operating parameters include cogeneration load management and boilers load management.

In some implementations, the method further involves displaying, via a user interface, the operating parameters on a display device; and displaying, via the user interface, benefits associated with the operating parameters on the display device.

The details of one or more embodiments of these systems and methods are set forth in the accompanying drawings and description below. Other features, objects, and advantages of these systems and methods will be apparent from the description, drawings, and claims.

BRIEF DESCRIPTION OF THE DRAWINGS

FIG. 16 illustrates a flowchart of an example method of multi-site optimization of industrial steam power and utility facilities, according to some implementations.

Like reference numbers and designations in the various drawings indicate like elements.

DETAILED DESCRIPTION

Figure 1A:
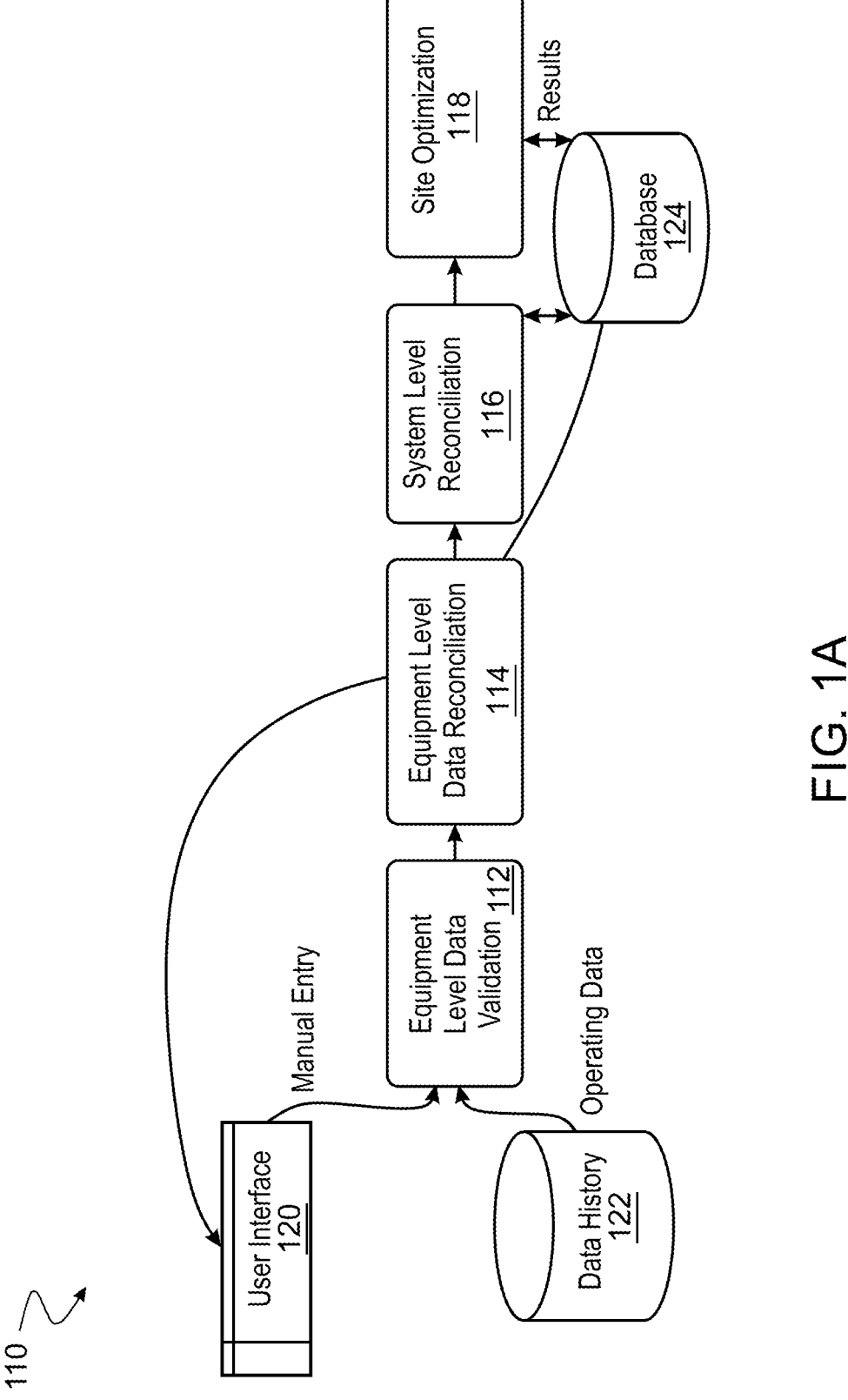
FIG. 1A illustrates a block diagram of a workflow for a site optimization, according to some implementations.

Improved operation, e.g., optimum operation, of steam and power utility systems in enterprises with multiple facilities, such as power generation, oil, gas, and petrochemical facilities helps lower operating costs, increase operational efficiency, and lower greenhouse gas (GHG) emissions, among other benefits.

This disclosure describes a real-time advisory system for controlling energy systems located in multiple facilities in order to improve operations of the energy systems. The multiple facilities can include power generation facilities and industrial facilities. The industrial facilities can include utility systems that generate different energy streams, such as power, steam, water, cooling, and heating. As described in more detail below, the facilities can include power generation equipment, such as boilers, Cogeneration units (cogen), steam turbines, and heat-exchangers. The facilities can include multiple power generation technologies, such as renewable energy, as well as industrial utility systems as part of an energy generation mix to meet energy demands.

In some implementations, the real-time advisory system generates a digital twin for each energy system in each facility. The real-time advisory system uses the digital twins and an optimization methodology to optimize the operation of the energy system in each site. Then, the optimization methodology optimizes the operation of the energy system across the multiple sites. To do so, the optimization methodology includes a site level optimization methodology and a multi-site level optimization methodology.

The site level and multi-site level optimization methodologies consider real-time operational data, thermodynamic properties, and energy correlations representing the equipment in each site. To optimize the energy system in a single site, the real-time advisory system considers several constraints, such as: (i) the closing material and energy balances for a base-case operation and for an optimized operation of the energy system at the site, (ii) equipment minimum and maximum operating limits at the site, and (iii) steam and power reserve requirements of the energy system at the site. And to optimize multiple sites, the real-time advisory system considers constraints for global optimization, such as: (i) generating specific power output values across the facilities, and (ii) site level and multi-site level constraints, such as equipment operating limits.

In some implementations, the real-time advisory system provides an accurate advisory model that provides meaningful recommendations both at the site level and the multi-site level. The real-time advisory system includes a layer for multi-site optimization that performs power generation fleet optimization and/or load management at an enterprise level (e.g., across multiple sites within an enterprise or sector). The real-time advisory system can account for multi-objective optimization using a main objective function and global constraints, such as operating cost, carbon dioxide ($CO_2$) emission reduction target, system level energy demands, and power reserve requirements. The multi-site optimization considers real-time operational data for single sites, thermodynamic properties, and energy correlations representing equipment at the sites.

One challenge when implementing such advisory systems is the accuracy of real-time data due to missing instrumentation or uncalibrated measurements. This disclosure describes techniques that overcome this and other challenges by implementing the advisory systems despite the absence of instrumentation or incorrect/improper calibration of measurements. To do so, this disclosure describes techniques that use real-time operational data, thermodynamic properties, and energy correlations that represent equipment of the industrial steam and power utility systems.

By considering constraints such as closing material balances and energy balances, first, at the equipment level, and then at the system level, the disclosure describes a base-case operation and an optimized case operation. In these operations, operational physical parameter values received from each equipment and corresponding values for the system as a whole are compared against maximum and minimum operating limits as well as steam and power reserve requirements. Equipment and system validation are performed using results of the comparison. The results are also used to adjust operational physical parameters of the equipment to optimize performance and operation of each equipment and that of the industrial power and utility system. The measurements and the results of the comparison are presented, via user interfaces displayed on computer monitors, to users (e.g., plant or equipment operators) in real-time to allow the users to adjust the operational physical parameters. In some instances, the measurements and the results of the comparison can be used to automatically adjust the operational physical parameters (e.g., by transmitting computer instructions to the equipment) without human intervention.

The techniques described in this disclosure can be implemented to achieve one or more of the following advantages. The techniques represent a simple, yet accurate real-time advisory model that can provide meaningful recommendations with potential benefits. Implementing the techniques provides plant operators with operational set points even if the plant has limitations on key measurements. The techniques described here negate the need to have a complete set of measurements to close steam's heat and mass balance. The techniques provide a real-time closed loop optimization that, while inexpensive, is nevertheless reliable and accurate. The techniques capitalize on a methodology that addresses metering and measurements issues of industrial steam and power utility systems, provides recommended actions to realize energy savings, improve system efficiency and reduce carbon dioxide, and, in some instances, implements the recommended actions without human intervention.

FIG. 1A illustrates a block diagram of a site optimization workflow 110, according to some implementations. The site optimization workflow 110 can be used for digital twin generation and operational optimization of industrial steam and power utility systems (also called "energy systems"). An example of an industrial steam power and utility system is described in FIG. 1B. In some examples, the site optimization workflow 110 can be performed by a computer system that includes one or more data processing apparatus (e.g., one or more data processors) and a computer-readable medium (e.g., a non-transitory computer-readable medium) storing computer instructions executable by the one or more data processing apparatus to perform the operations of the site optimization workflow 110. An example computer system is described below in connection with FIG. 17.

Figure 4:
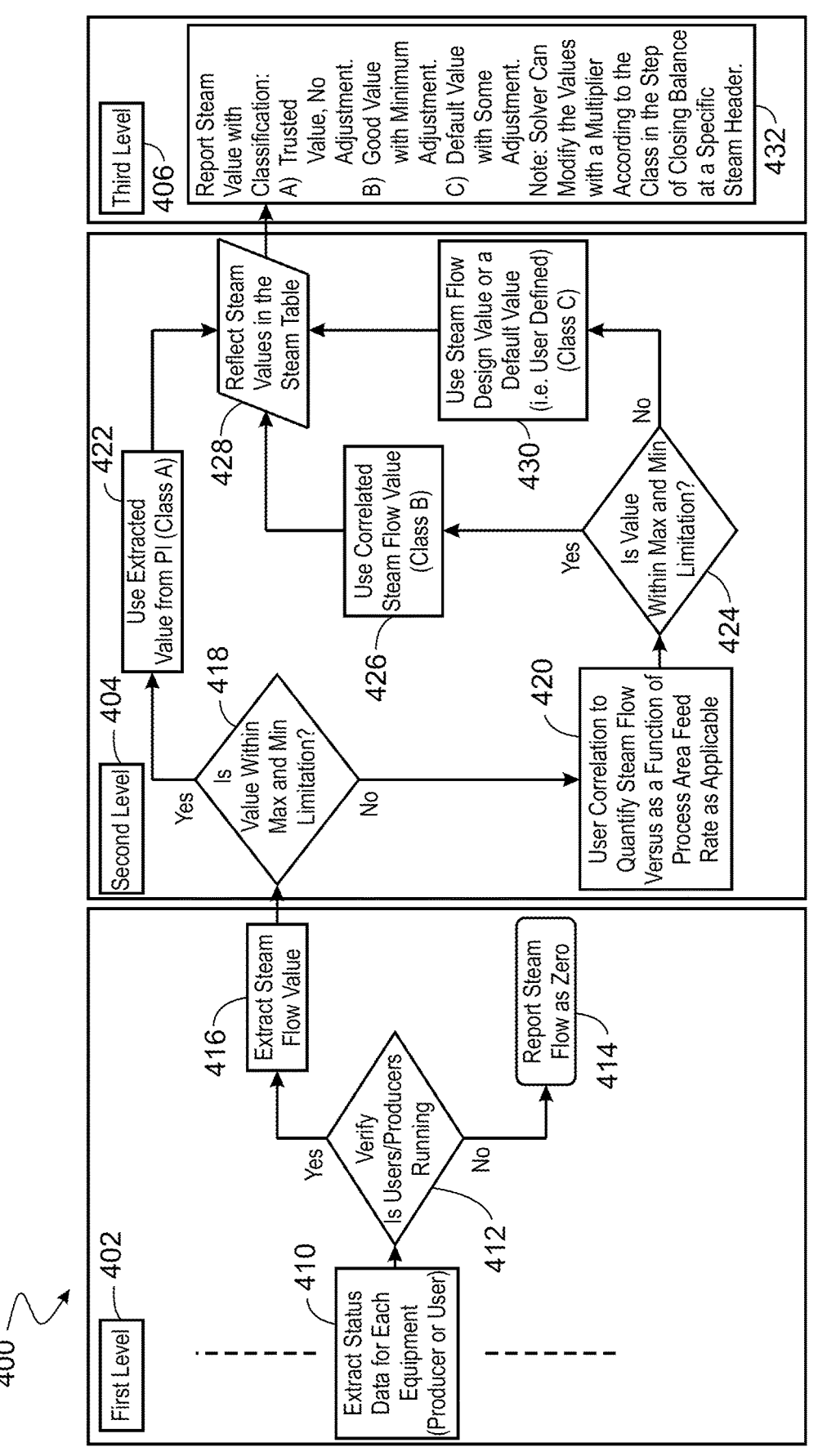
FIG. 4 illustrates a workflow showing an example data validation procedure for an equipment in the industrial steam power and utility system, according to some implementations.

The site optimization workflow 110 starts at step 112 of performing equipment level data validation at a facility. This equipment level data validation is described in more detail below. For example, FIG. 4 illustrates a workflow of an example data validation procedure for equipment in an industrial steam power and utility system. As shown in FIG. 1A, the equipment level data validation uses data history 122, which is a database that stores historical data of the equipment. Additionally, a user can manually enter, e.g., via user interface 120, corrections to equipment data as part of the equipment level data validation. Once the equipment level data validation is complete, the site optimization system moves to step 114.

At step 114, the site optimization workflow 110 involves performing equipment level data reconciliation at the facility. Generally, data reconciliation involves comparing and aligning data from various sources or measurements to ensure consistency, accuracy, and reliability. In this step, the data is reconciled at the equipment level. The equipment level data reconciliation is described in more detail below.

At step 116, the site optimization workflow 110 involves a system level reconciliation. In this step, the data is reconciled at the level of each energy system, e.g., a header, which serves as a central distribution point for fluids or gases within the facility and includes multiple equipment like boilers and steam generators. The system level reconciliation is described in more detail below. As shown in FIG. 1A, the results of the system level reconciliation are stored in database 124.

Figure 3:
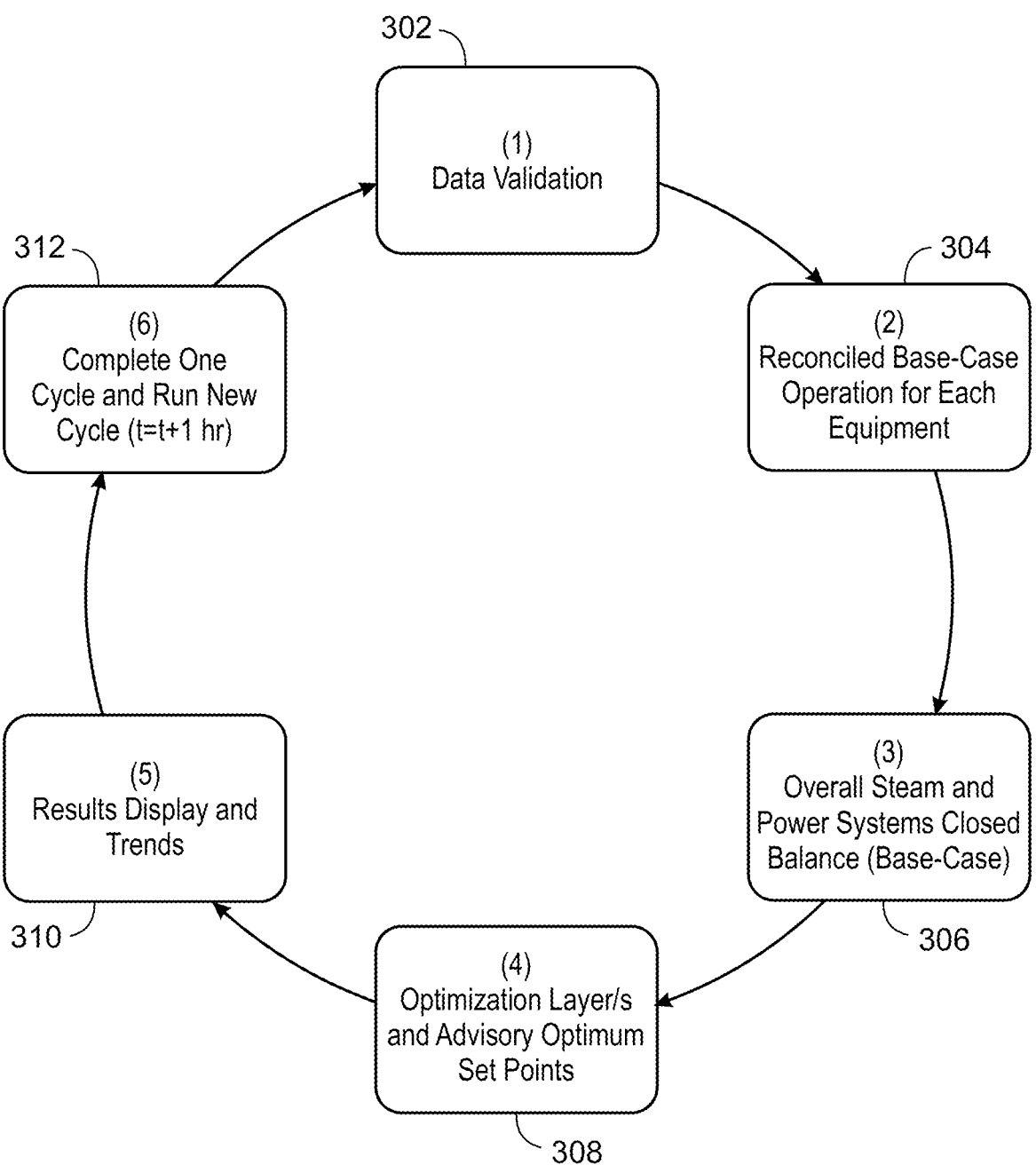
FIG. 3 illustrates a schematic representation of optimization operations implemented by a computer system on the industrial steam power and utility system, according to some implementations.

At step 118, the site optimization workflow 110 involves an overall site optimization. In this step, the overall operation of the site is optimized. The site optimization is described in more detail below. For example, FIG. 3 illustrates a schematic representation of multi-site optimization operations. Further, as shown in FIG. 1A, the results of the site optimization are stored in database 124. The results from the energy system level reconciliation and the site optimization can be displayed on the user interface 120. As described in more detail below, the user interface 120 can display advisory recommendations to adjust the loads on major equipment with indication of the potential benefits of such changes.

Figure 1B:
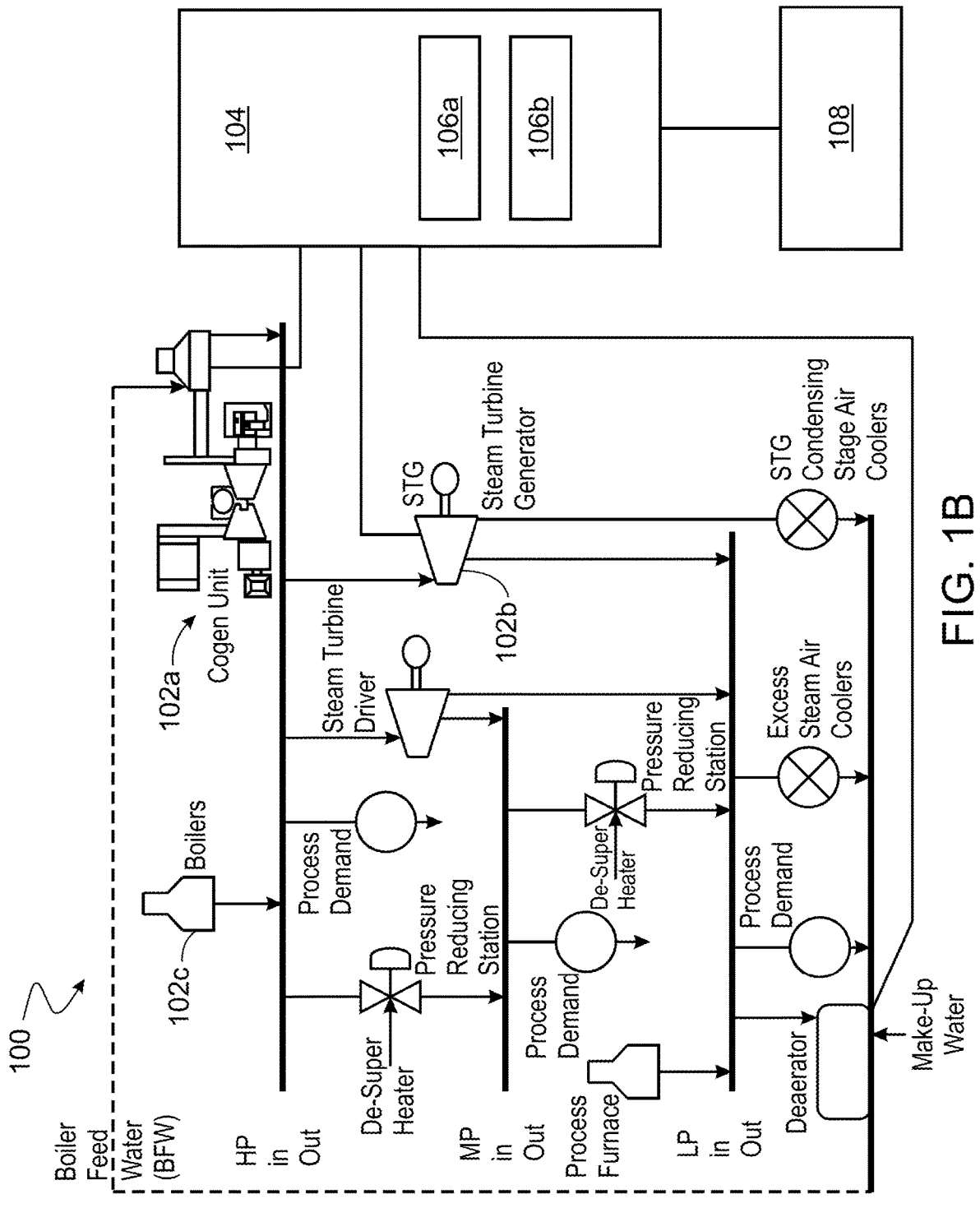
FIG. 1B illustrates a schematic representation of an industrial steam power and utility system that operates multiple equipment, according to some implementations.

FIG. 1B is a schematic representation of an industrial steam power and utility system 100 (sometimes referred to as "an industrial plant") that operates multiple equipment including, for example, a cogeneration unit 102a, a steam turbine 102b, boilers 102c and others. The list below shows legends of abbreviations shown in FIG. 1A.

BFW: Boiler feed water flow rate

BD: blow down flow rate

CC: cycle of concentration of blow down.

STM: steam flow rate

H_: Enthalpy

HHV: Fuel high heating value,

SF: Supplementary firing flow rate

GT_load: Gas turbine % of load

W_rated_adj: degradation factor for gas turbine power out comes

S_eff: Steam turbine isentropic efficiency

MAX_W: maximum power output at S_eff=100%

W: is the actual work from an equipment (i.e. Cogen, steam turbine and others)

H_OUT: Enthalpy Out

H_IN: Enthalpy for Inlet

H_ise: Isentropic Enthalpy

H_OUT_M: Enthalpy Out for MP extraction stage

H_OUT_L: Enthalpy Out for LP extraction stage

H_OUT_C: Enthalpy Out for a condensing stage

X_C: steam quality of the steam existing steam turbine condensing stage

P_OUT_C: pressure of steam at the condensing stage

CR: Process Condensate return factor

Each equipment implements a process or processes, and the system 100 collectively implements all the equipment to convert steam into energy. While implementing the process or processes, each equipment outputs an operational physical parameter value. For example, the operational physical parameter can include temperature, pressure, flow rate or similar parameters experienced by the equipment. The operational physical parameter is a value representative of the corresponding parameter, e.g., a temperature value, a pressure value, a flow rate value. Multiple sensors (not shown) can be operatively coupled to each equipment to measure the operational physical parameters. The sensors (e.g., thermocouple to sense a temperature value, pressure gauge to sense a pressure value, flow meter to sense a flow rate value, and similar sensors) can transform the sensed physical parameters into digital signals, and transmit the signals to a destination.

In some implementations, the boiler model representation is governed by the following equations:

| | |
|---|---|
| Mass balance for water/steam | $BFW - BD - STM = 0.0$ |
| Definition of BD based on CC | $(CC - 1)*BD - STM = 0.0$ |
| Correlation for the fuel | $Fuel = a1*STM^2 + b1*STM + c1$ |
| Efficiency calculation | $STM(H\_STM - H\_BFW) - Eff(Fuel*HHV\_fuel) = 0.0$ |
| Lower bound steam flow rate | $STM \geq MIN\_LOAD$ |
| Upper bound steam flow rate | $STM \leq MAX\_LOAD$ |

In some implementations, the cogen model representation is governed by the following equations:

| | |
|---|---|
| Mass balance for water/steam | BFW – STM – BD = 0.0 |
| Definition of BD based on CC | (CC – 1)*BD – STM = 0.0 |
| Power correlation | W = a2 * T_amb^2 + b2 *T_amb + c2 |
| Fuel correlation | Fuel *HHV_fuel = a3 *(T_amb – ΔT) + b3* W + c3 |
| Steam correlation | STM = (a4*(T_amb – ΔT) + b4* GT_load + c4*W + d4)*CV |
| Steam supplementary firing | STM_SF = a5*SF |
| Fuel supplementary firing | SF = Fuel_SF*HHV_fuel |
| Efficiency calculation | W + STM(H_STM – H_BFW) – Eff(Fuel*HHV_fuel) = 0.0 |
| Load definition | GT_load*W_rated_adj = W |
| Power lower bound | W ≥ MIN_W |
| Power upper bound | W ≤ MAX_W |
| Steam lower bound | STM ≥ MIN_S |
| Steam upper bound | STM ≤ MAX_S |
| Supplementary firing upper bound definition | MAX_SF = a6 *(T_amb – ΔT) + b6 *W + c6 |
| Supplementary firing lower bound | SF ≥ MIN_SF |
| Supplementary firing upper bound | SF ≤ MAX_SF |
| Bypass closing lower bound | CV ≤ MIN_CV |
| Bypass closing upper bound | CV ≥ MAX_CV |

In some implementations, the steam turbine representation is governed by the following equations:

| | |
|---|---|
| Mass balance | ST_F_in – ST_F_OUT = 0.0 |
| Correlation for isentropic efficiency | S_eff = a7*(W/MAX_W)^2 + b7*(W/MAX_W) + c7 |
| Power calculation | W = ST_F_in*(H_OUT – H_IN) |
| Enthalpy calculation | H_OUT – H_IN = S_eff*(H_ise – H_IN) |
| Temperature calculation | T_OUT = f(P_OUT, H_OUT); P: pressure; H: Enthalpy |
| Power lower bound | W ≥ MIN_W |
| Power upper bound | W ≤ MAX_W |
| Steam lower bound | F_IN ≥ MIN_S |
| Steam upper bound | F_IN ≤ MAX_S |

In some implementations, the multi-stage steam turbine representation is governed by the following equations:

| | |
|---|---|
| Mass balance | F_IN – F_OUT_M – F_OUT_L – F_OUT_C = 0.0 |
| Correlation for isentropic efficiency | S_eff = a8*(W/MAX_W)^2 + b8*(W/MAX_W) + c8 |
| Enthalpy calculation M | H_OUT_M – H_IN = S_eff*(H_ise_M – H_IN) |
| Enthalpy calculation L | H_OUT_L – H_OUT_M = S_eff*(H_ise_L – H_IN) |
| Enthalpy calculation C | H_OUT_C = f(X_C, P_OUT_C) |
| Power calculation | W = F_OUT_M*(H_OUT_M – H_IN) + F_OUT_L*(H_OUT_L – H_IN) + F_OUT_C*(H_OUT_C – H_IN) |
| Temperature calculation M | T_OUT_M = function(P_OUT_M, H_OUT_M) |
| Temperature calculation L | T_OUT_L = function(P_OUT_L, H_OUT_L) |
| Temperature calculation C | T_OUT_C = function(P_OUT_C, H_OUT_C) |
| Power lower bound | W ≥ MIN_W |
| Power upper bound | W ≤ MAX_W |
| Steam lower bound | F_IN ≥ MIN_S |
| Steam upper bound | F_IN ≤ MAX_S |

In some implementations, the steam user representation is governed by the following equations:

| | |
|---|---|
| Mass balance | CR*F_IN – F_OUT = 0.0 |
| Steam demand balance | F_IN*H_IN – F_OUT*H_OUT – Q = 0.0; (Q are the losses in the system) |

In some implementations, the let-down station representation is governed by the following equations:

| | |
|---|---|
| Mass balance | F_IN – F_OUT = 0.0 |
| Energy balance | H_IN – H_OUT = 0.0 |
| Temperature calculation | T_OUT = f(H_OUT, P_OUT) |
| Lower bound steam flow rate | F_IN ≥ MIN_S |
| Upper bound steam flow rate | F_IN ≤ MAX_S |

In some implementations, the air-cooled condensers representation is governed by the following equations:

| | |
|---|---|
| Mass balance steam side | F_IN – F_OUT = 0.0 |
| Energy balance steam side | F_IN*H_IN – F_OUT*H_OUT – Q = 0.0 |
| Energy balance air side | F_air*Cp_air * (T_air_in – T_air_out) + Q = 0.0; (where CP is heat capacity of air) |
| Calculate the power of the fans | W = (a9 *F_fan^3 + b9*F_fan^2 + c9*F_fan + d1)*N |
| Calculate air outlet temperature | T_air_out ≤ T_OUT – MIN_DT |
| Air flow rate per fan | F_fan*N = F_air |
| Minimum air flow per fan | F_fan ≥ MIN_F_air_n |
| Maximum air flow per fan | F_fan ≤ MAX_F_air_n |

In some implementations, the deaerator representation is governed by the following equations:

| | |
|---|---|
| Mass balance | MW – BFW + STM_IN – STM_OUT = 0.0 |
| Energy balance | MW*H_MW – BFW*H_BFW + STM_IN*H_S_IN – STM_OUT*H_S_OUT = 0.0 |
| Lower bound steam flow rate | STM_IN ≥ MIN_S |
| Upper bound steam flow rate | STM_IN ≤ MAX_S |

In some implementations, the pump representation is governed by the following equations:

| | |
|---|---|
| Power calculation (process hp) | W = (F)*(P_OUT – P_IN) |
| Shaft power (Bhp) | W_shaft = W/eff |
| Efficiency from the pump curve | eff = A_eff*F^2 + B_eff*F + C_eff |

In some implementations, the steam flash drum representation is governed by the following equations:

| | |
|---|---|
| Mass balance | F – V – L = 0.0; (where V is vapor and L is liquid) |
| Energy balance | F*H_F – V*H_V – L*H_L = 0.0 |
| Lower bound feed flow rate | F ≥ MIN_F |
| Upper bound feed flow rate | F ≤ MAX_F |

In some implementations, the steam header representation is governed by the following equations:

| | |
|---|---|
| Mass balance | $(1 - STM\_LF)\Sigma F\_IN(i) - \Sigma F\_OUT(j) = 0.0$ |
| Energy balance | $(1 - STM\_LF)\Sigma F\_IN(i)*H\_IN(i) -$ $\Sigma F\_OUT(j)*H\_OUT(j) = 0.0$ |

In some implementations, the system 100 is operatively coupled to a computer system 104 that includes one or more data processing apparatus 106a (e.g., one or more data processors) and a computer-readable medium 106b (e.g., a non-transitory computer-readable medium) storing computer instructions executable by the one or more data processing apparatus 106a to perform the operations described in this disclosure. For each equipment in the system 100, the computer system 104 receives operational physical parameter values measured by sensors mounted on the equipment during operation of the equipment. For example, the computer system 104 receives the digital signals representing sensed operational physical parameter values measured by the sensors. The computer system 104 can store the received signals to implement the processing described below.

In some implementations, the computer system 104 can use the received operational physical parameter values to determine mass balance and energy balance parameters associated with the equipment from which the operational physical parameter values were received. Using the determined mass balance and energy balance parameters, the computer system 104 can validate an operation of the equipment. Such validation can include comparing the mass balance and energy balance parameters determined for the equipment against threshold mass balance and energy balance parameters. If the results of the comparison reveal that the threshold parameters are satisfied, the operation of the equipment is validated as being satisfactory. To the contrary, if the results reveal that the threshold parameters are not satisfied, the operation of the equipment is validated as being unsatisfactory. Determining such parameters includes processing the received values as described below with reference to FIGS. 4-12. In this manner, the computer system 104 can implement validation operations on each equipment in the system 100.

In some implementations, after validating an operation of each equipment in the system 100 using the determined mass balance and energy balance parameters determined for each equipment, the computer system 104 can validate an operation of the system 100 as a whole. To do so, the computer system 104 can determine mass balance and energy balance parameters associated with the system 100 using the mass balance and energy balance parameters associated with each equipment. Using the determined mass balance and energy balance parameters determined for the system 100, the computer system 104 can validate an operation of the system 100 as a whole. Such validation can include comparing the mass balance and energy balance parameters determined for the system 100 against system-wide threshold mass balance and energy balance parameters. If the results of the comparison reveal that the threshold parameters are satisfied, the operation of the system 100 is validated as being satisfactory. To the contrary, if the results reveal that the threshold parameters are not satisfied, the operation of the system 100 is validated as being unsatisfactory.

Figure 2:
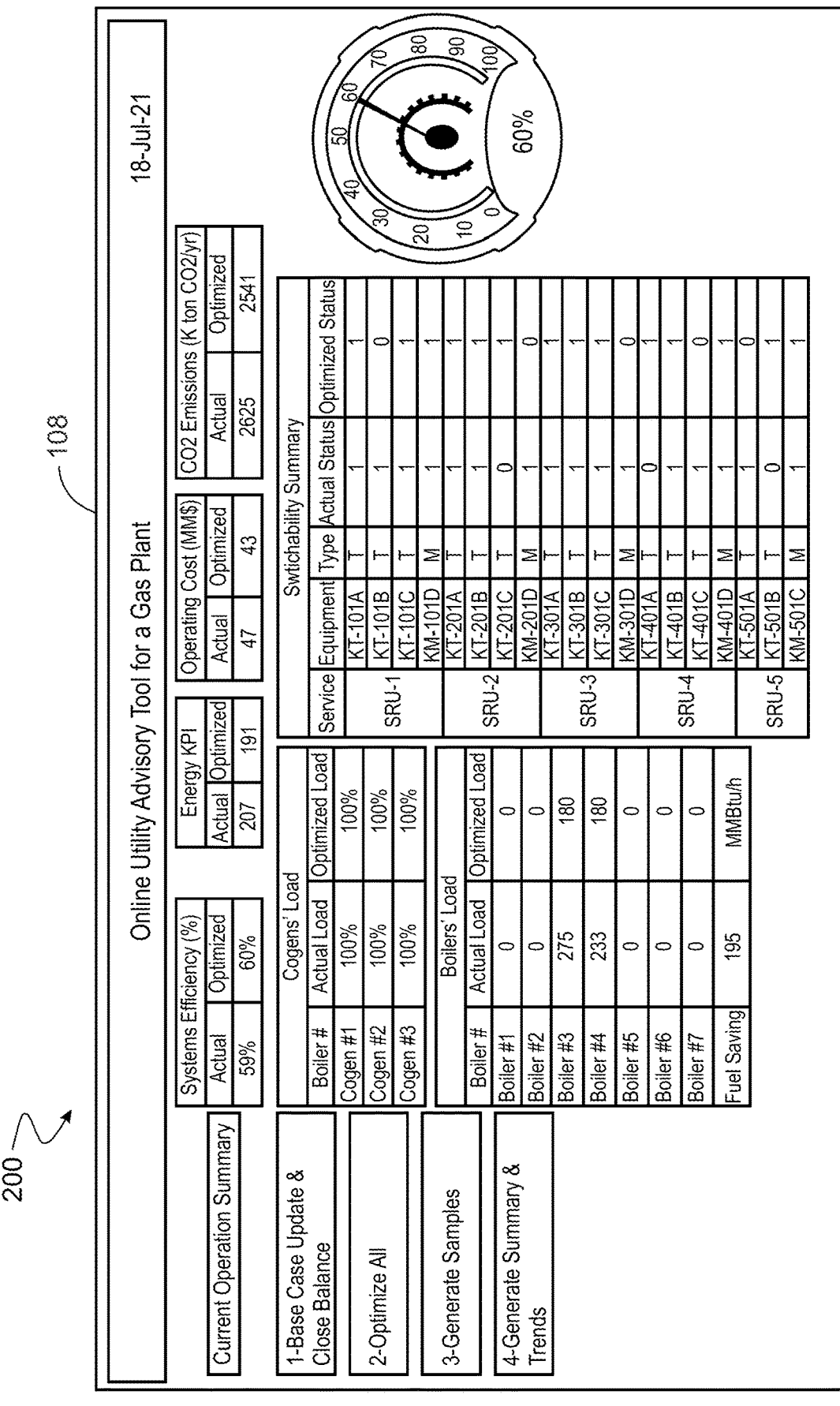
FIG. 2 illustrates a schematic representation of a user interface displayed on a computer monitor, according to some implementations.

In some implementations, the computer system 104 is operatively coupled to a computer monitor 108. Real-time outputs of the determination and validation operations can be displayed in the computer monitor 108. FIG. 2 is a schematic representation of a user interface 200 displayed on the computer monitor 108. The "Current Operation Summary" portion discloses a procedure to run the online optimization system. The procedure can be run automatically at a frequency, e.g., once an hour. The "System Efficiency" portion shows supply side thermal efficiency for actual operation and optimized case. The "Cogens' Load" portion shows loading (actual operation and optimized case) for the cogeneration system. The "Boilers' Load" portion shows loading (actual operation and optimized case) for the boiler system. The "Energy KPI" portion shows energy intensity KPI (key performance indicator) for actual operation and optimized case. The "Operating Cost" portion shows the operating cost for actual operation and optimized case. The "CO2 Emissions" portion shows carbon dioxide emission for actual operation and optimized case.

Figure 1C:
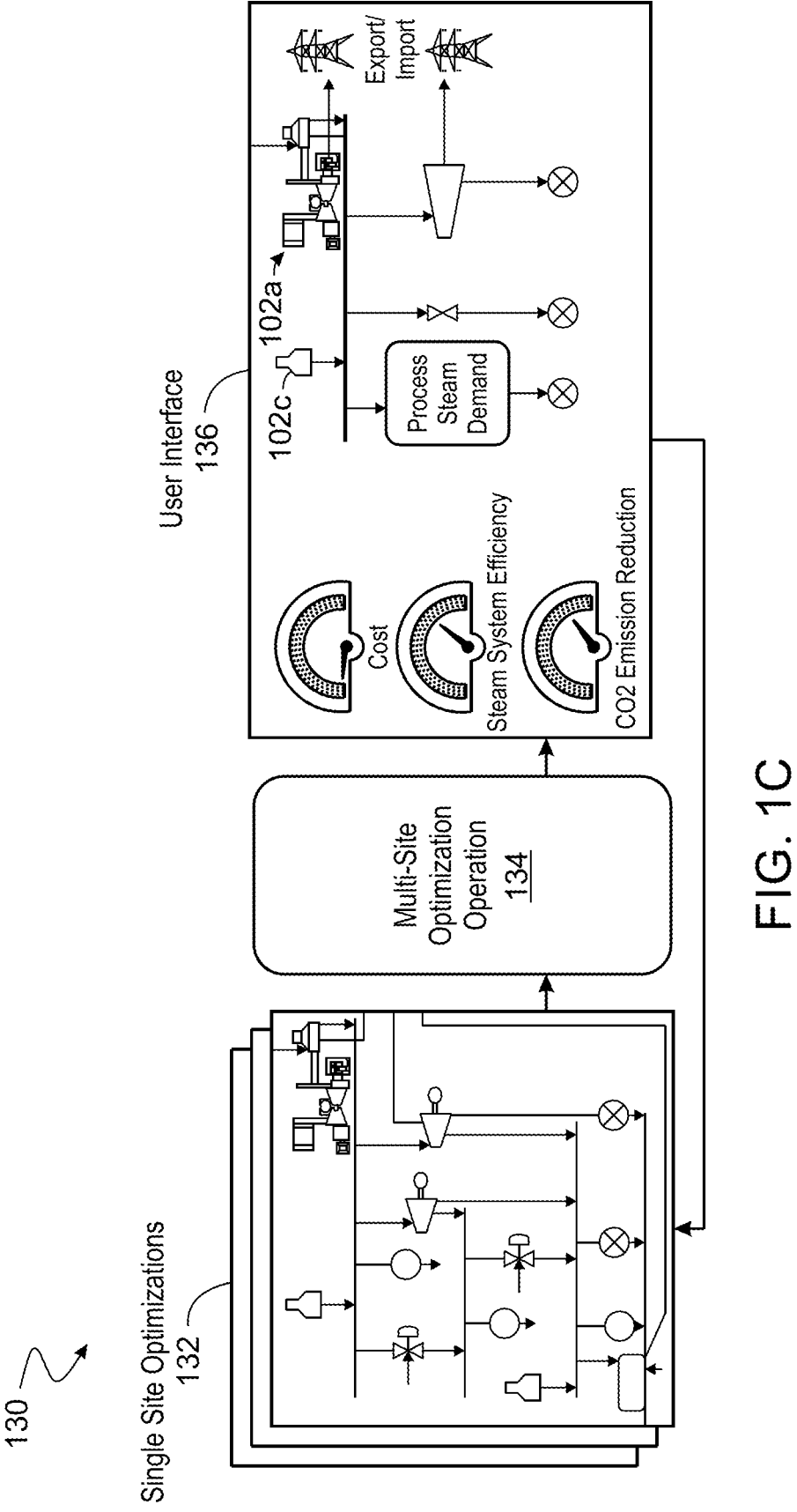
FIG. 1C illustrates a schematic representation of a multisite optimization, according to some implementations.

FIG. 1C illustrates a schematic representation of a multi-site optimization 130, according to some implementations. The multi-site optimization 130 can be performed by a multi-site optimization system, such as computer system 1700 of FIG. 17. The multi-site optimization 130 can be used for digital twin generation and operational optimization of industrial steam and power utility systems in multiple facilities. As shown in FIG. 1C, the multi-site optimization involves single site optimizations 132 being performed at each of the multiple facilities. The single site optimizations 132 can be performed sequentially or simultaneously.

Once the single site optimizations 132 are complete, the multi-site optimization system generates a matrix of the results of the single site optimizations. As described in more detail below, the multi-site optimization system uses an optimization function and the matrix to perform a multi-site optimization operation 134 to optimize the operation of the multiple facilities. The multi-site optimization is also called an economic dispatch model (EDM). The multi-site optimization system then displays the results of the multi-site optimization on a user interface 136. As shown in FIG. 1C, the user interface 136 displays information such as the benefits of the optimization (e.g., cost reductions, steam system efficiency, and CO2 emission reduction) and the equipment to turn ON/OFF at each site to achieve the optimization. Additionally, the user interface 136 displays information such as process steam demand, and power import and export amount and/or cost savings associated with the various actions.

FIG. 3 is a schematic representation of optimization operations implemented by the computer system 104 on the system 100. FIG. 3 shows that the optimization operations are cyclical. For example, at step 302, the computer system 104 implements the data validation operations at the equipment level. The computer system 104 performs step 302 for each equipment in the system 100. In some implementations, the computer system 104 can implement the data validation operations for all the equipment in parallel. At step 304, after implementing the data validation operation for all the equipment in the system 100, the computer system 104 reconciles base-case operation for each equipment. At step 306, the computer system 104 implements mass balance and energy balance for the overall system 100. Optionally, at step 308, the computer system 104 implements optimization and identifies advisory optimum set points for the system 100 as a whole using results of the prior steps. At step 310, the computer system 104 displays the results of performing the prior steps including any output and trends, for example, in the computer monitor 108.

At step 312, the computer system 104 repeats the cycle of steps 302, 304, 306, 308 and 310. In some implementations, the computer system 104 can repeat the cycle at a frequency, for example, once per hour, or once per a different duration that can be varied in response to user input. In this manner, the computer system 104 can periodically monitor the system 100, both at an equipment level and at a system-wide level, implement validation and optimization measures, and provide outputs of the validation and optimization for display in a user interface. Examples of validation are described with reference to FIGS. 4-11.

FIG. 4 is a workflow showing an example data validation procedure 400 for an equipment in the industrial steam power and utility system. The data validation procedure 400 is a generic procedure that is applicable to any equipment that is or can be used in the system 100. The procedure 400 includes multiple operations, each of which can be implemented at least partially by the computer system 104. To do so, computer-executable code can be stored in the computer-readable medium 106b and executed by the data processing apparatus 106a. When implementing the operations, the computer system 104 receives operational physical parameter values from the equipment, and compares the received values with threshold values associated with the equipment. In some implementations, the computer system 104 can process the received values to determine mass balance and energy balance parameters, and compare the determined parameters against threshold parameters.

In addition, the procedure 400 can be implemented in multiple levels arranged in a hierarchy. The example procedure 400 includes three levels—a first level 402, a second level 404 and a third level 406. Some procedures can have more levels while others can have fewer levels. The first level 402 can represent a root level while the last level (e.g., the third level 406) can represent a leaf level without or with intermediate levels, e.g., the second level 404. In operation, the computer system 104 can implement the root level first, and implement subsequent levels down the hierarchy until the leaf level. For each level (except the leaf level), the computer system 104 can determine outputs and use the determined outputs as inputs for the next lower level in the hierarchy.

For example, the computer system 104 can implement step 410 in the first level 402 to extract status data for each equipment. The status data is received from sensors mounted to the equipment. For example, the status data is a DCS tag that provides an ON/OFF status of the equipment. In the context of this disclosure a "Producer" is a steam generating equipment such as a boiler, a cogeneration system or a process heater with convection section that produces steam connected to a steam header. In the context of this disclosure a "User" is a steam consuming equipment such as a heat exchanger or a re-boiler.

At 412, the computer system 104 verifies if users/producers is running. If the computer system 104 determines that users/producers is not running (decision branch "NO"), then the computer system 104 reports stream flow as zero, and the validation procedure ends. If the computer system 104 determines that users/producers is running (decision branch "YES"), then, at 416, the computer system extracts steam flow value. The steam flow values and all other values are extracted from a data historian system called Process Interface (PI) system, which will collect all information in real time from DCS.

At this point, the implementation of the first level 402 has been completed. The computer system 104 passes the extracted steam flow value as an input to the second level 404.

The computer system 104 can implement step 418 in the second level to check if the received steam flow value is within a threshold range (i.e., maximum and minimum limitations). If the computer system 104 determines that the value is not within the threshold range (decision branch "NO"), then the computer system 104 implements a user correlation to quantify steam flow versus as a function of process area feed rate as applicable. The correlation equation is an alternative way to provide a more accurate steam consumption value for a steam flow rate that has a faulty reading, e.g., because the DCS tag is faulty or the sensor attached to the equipment is faulty or both). The correlations are developed based on historical trends for key parameters that have direct impact on the steam consumption. The correlations were developed outside the system and revised from time to time to have more accurate representation of the equipment and its performance.

If the computer system 104 determines that the value is within the threshold range (decision branch "YES"), then the computer system 104 uses the extracted value from PI. The procedure mentions three categories-Class A, Class B and Class C. Class A, is a category class to differentiate accurate measurements with others. The value in Class A, is a trusted value and will be subject to minimum adjustment to close the energy and material balance for a steam header.

Returning to the decision branch "NO," after implementing the user correlation at step 420, the computer system 104 checks if the value is within a threshold range (i.e., maximum and minimum limitations). If the computer system 104 determines that the value is not within the threshold range (decision branch "NO"), then, at step 430, the computer system 104 uses steam flow design value or a user defined default value. Class C, is a category class to differentiate accurate measurements with others. The value in Class C, is a given value (i.e. default, suggested by an experience user for a common average value), where, design value is the value mentioned in the design document for this specific user. Both are not trusted values and will be subject to a major adjustment to close the energy and material balance for a steam header compared to class A.

If, at step 420, the computer system 104 determines that the value is within the threshold range (decision branch "YES"), then the computer system 104 uses the correlated steam flow value. Class B, is a category class to differentiate accurate measurements with others. The value in Class B, is relatively more accurate value that Class C. The value will be subject to a minor adjustment to close the energy and material balance for a steam header. The optimization technique will adjust the boundary limits for class A, B and C as required in an consistent way to ensure energy and material balances are closed at all time.

In this manner, if the computer system 104 determines that an operational physical parameter value received from a sensor attached to an equipment in the system 100 is accurate, then the computer system 104 uses that value in subsequent mass balance and energy balance determinations. If not, then the computer system 104 implements correlation operations to determine a closest approximation of what the sensor value would have been and uses that correlated value in the mass balance and energy balance determinations. Moving to step 428, the computer system 104 reflects the steam values in the steam table, i.e., stores the values in a database part of the steam balance together with a specific timestamp identifying when the value was determined.

The computer system 104 outputs the steam value with the classification (class A—trusted value that does not require an adjustment; class B—good value that requires minimum adjustment; class C—default value that requires some adjustment).

The computer system 104 can implement step 432 in the third level 406 to report the steam value received as the output of the second level 404. In some implementations, the computer system 104 can associate a weight to the received value based on the class associated with the value. Because a class A value is trustworthy, the weight can be 1. Because a class B value is comparatively less trustworthy, the weight can be less than 1. Because the trustworthiness of the class B value is between that of a class A value and a class C value, its weight can be between the weight of a class A value and the weight of a class C value. The computer system 104 can output the steam value, its classification and, optionally, its weight as an output of the validation procedure 400. As mentioned earlier, he optimization technique will adjust the boundary limits for class A, B, and C as required in an consistent way to ensure energy and material balances are closed at all time.

FIGS. 5-12 are workflows showing example data validation procedures for a heat exchanger, a cogeneration system, a boiler, a process heater, mechanical drivers and power generators, a motor-pump/compressor, and a gas turbine, respectively. Each data validation procedure is substantially similar to the data validation procedure 400. Whereas the data validation procedure 400 is generic to any equipment in the system 100, each of the data validation procedures shown in FIGS. 5-12 are implemented with reference to a specific equipment.

Figure 5:
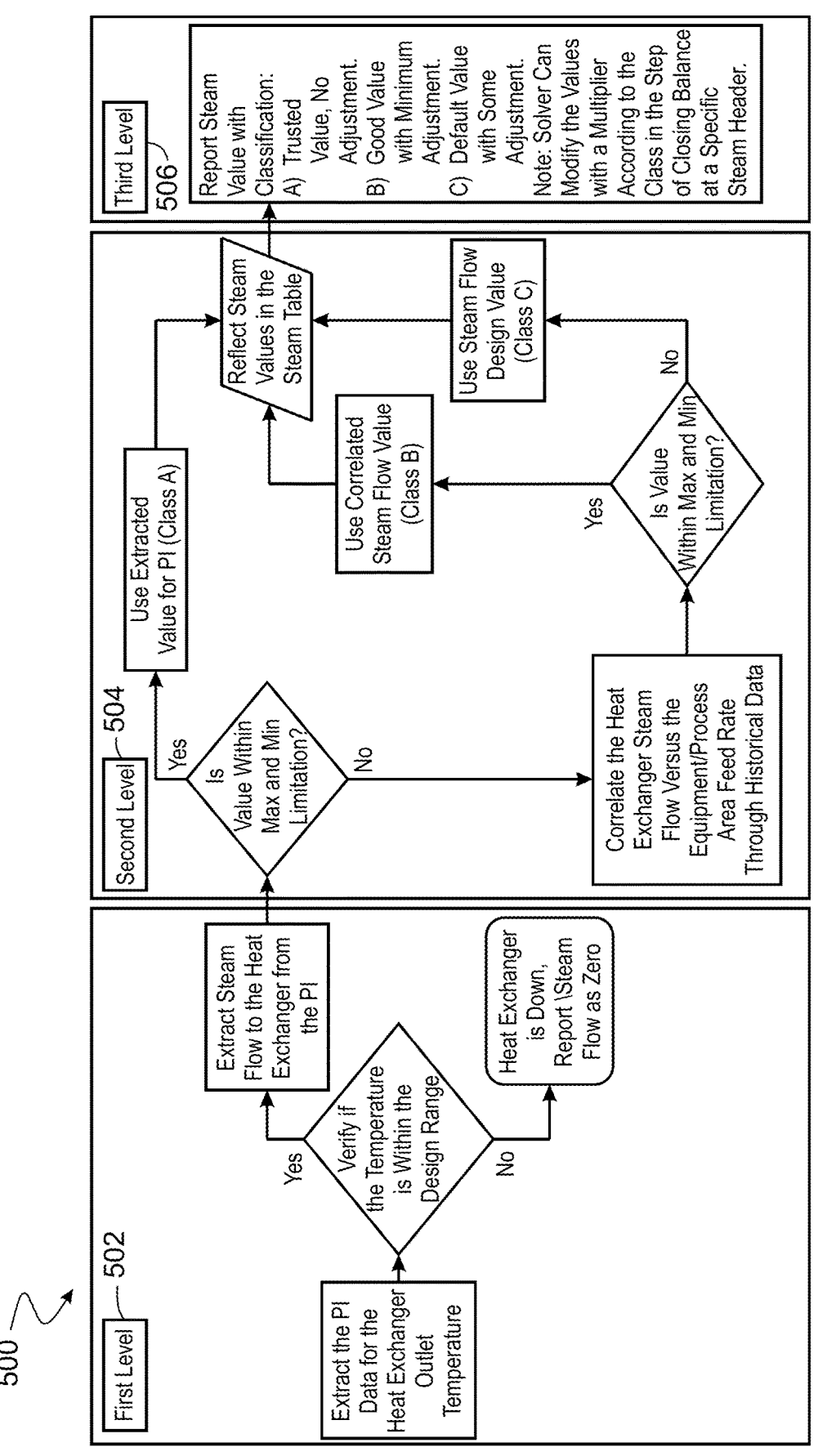
FIG. 5 illustrates a workflow showing an example heat exchanger data validation procedure, according to some implementations.

For example, FIG. 5 is a workflow showing an example data validation procedure 500 for a heat exchanger. The heat exchanger steam users include all the facility reboilers and process heaters connected to different steam headers. The heat exchanger steam consumption data validation procedure 500 (HX-DVR) includes three levels of validation and reconciliation. On the first level 502, the exchangers are checked whether they are online or offline by the process stream outlet temperature. The temperature limit where the exchanger is considered to be is based on design data or historical data or a combination of both. The steam flow reading from PI is not accounted if the temperature is below the set limit and that exchanger steam flow is reflected as zero. At the second level 504, the extracted steam flow reading is refined through minimum and maximum limitations. At the level 504, the limitations are set based on the exchangers steam flow rate design data. If the extracted data from PI is within the set limitations, then the PI value reading is reflected in the steam table with classification A. If the PI reading is out of the minimum and maximum limitations, then a correlated steam flow reading based on historical data is used. If the correlated value is within the minimum and maximum limitations, then that value is reflected in the steam table with classification B. At the end of the validation procedure, if the correlated value is not within the minimum and maximum limitations, then the design steam flow reading is used with a classification C. The third level 506 of validation is to ensure that the reported values in the steam table lead to a close balance and adjusting the steam flow values based on their classification as—class A—trusted value that does not require an adjustment; class B—good value that requires minimum adjustment; class C—default value that requires some adjustment. For any PI reading for a heat exchange specific operational parameter value received the sensors (implemented, for example, as a distributed control system), there is always a reliable value representing the specific operational physical parameter as an output from the data validation procedure 500 regardless of the issues associated with the subject PI value, thereby ensuring a reliable system with accurate outcomes as much as possible.

Figure 6:
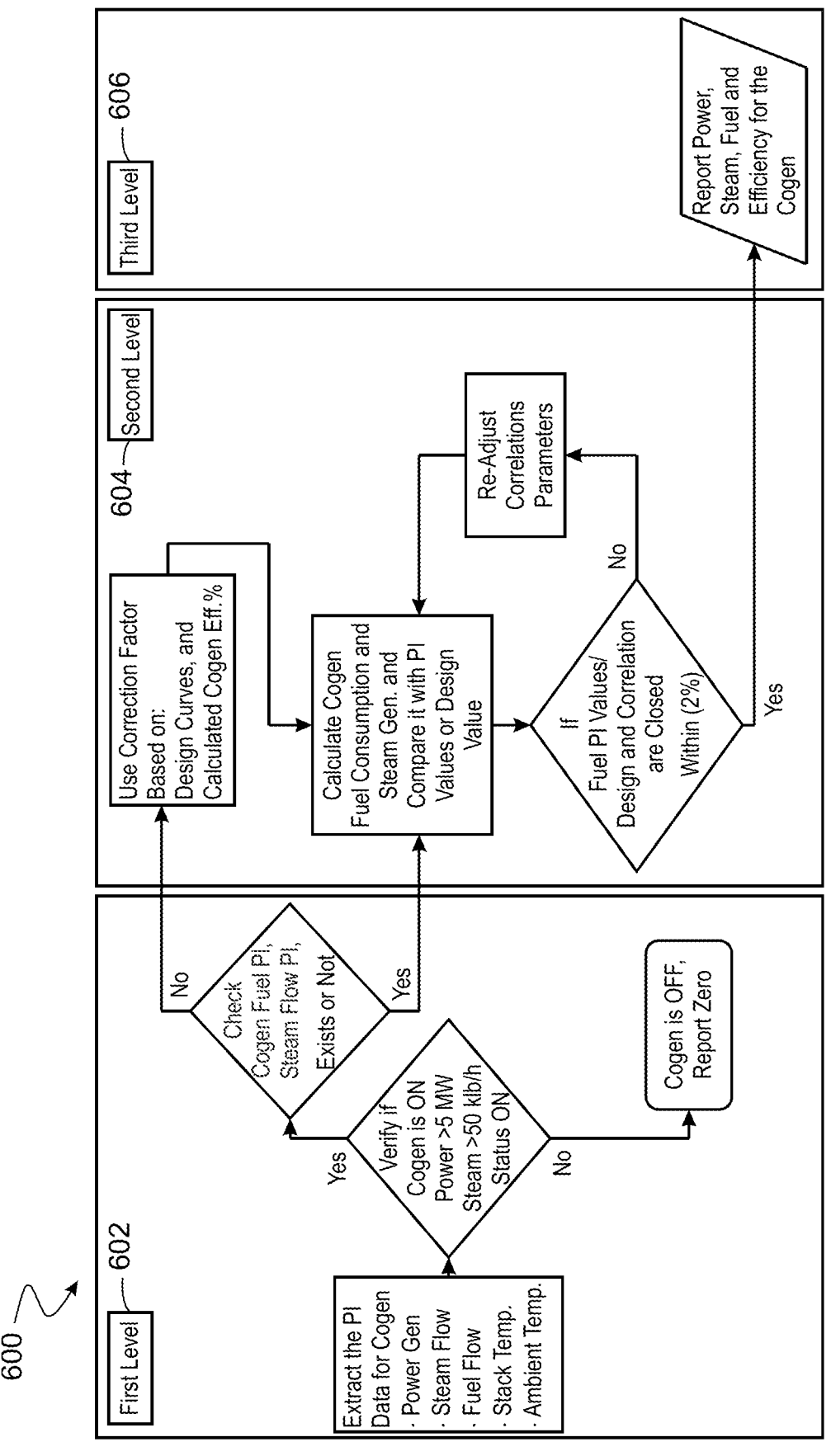
FIG. 6 illustrates a workflow showing an example cogeneration data validation procedure, according to some implementations.

FIG. 6 is a workflow showing an example cogeneration data validation procedure 600 for a cogeneration system. The cogeneration data validation procedure 600 (CGN-DVR) forms a part of the industrial plant's online CHP model, i.e., a Combined Heat and Power system model, which is an optimization model developed to represent the steam and power systems for an industrial facility.

The validation procedure 600 includes three levels of data validation and reconciliation. Key measurements from a DCS pertaining to a cogeneration system are used as inputs to determine the current operational condition of cogeneration equipment such as a gas turbine and a heat recovery steam generator (HRSG). In the first level 602, the gas turbine status is checked to see if it is online or offline. The electrical power generation and steam flow from the HRSG can be used to check if the cogeneration system is operational. The power and steam limits where the cogeneration system is considered to be online is typically based on design data or historical data or a combination of both. The steam flow reading from PI, on the other hand, is not accounted, if the temperature is below the set limit and that the HRSG steam flow is reflected as zero. At the second level 602, interrelated variables are reconciled to ensure that measured and reconciled parameter are within 2% error. The extracted power, steam flow, fuel flow and stack temperature values are bound within reasonable lower and upper limits. If the extracted data from PI is within set limits, then the PI value reading is reflected in the model. If the PI reading is out of the minimum and maximum limitations, then correlated values based on historical data are used. If the correlated value is within the min and max limitations, then that value is reflected in the model. At the end of the validation procedure 600, if the correlated value is not within the minimum and maximum limitations, then the design data is used. The third (and final) level of validation 606 ensures that the reported values in the model leads to a close balance.

Figure 7:
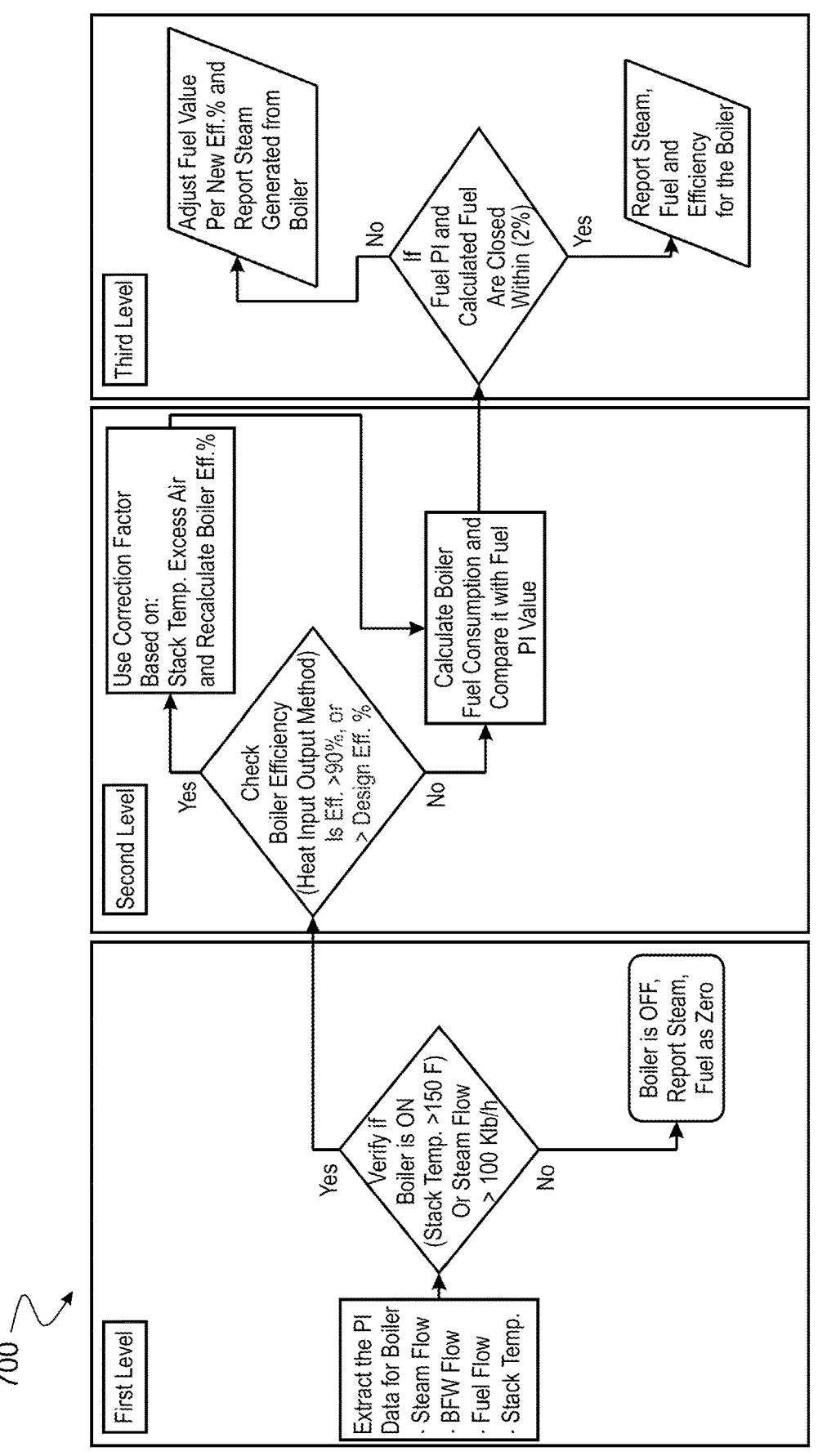
FIG. 7 illustrates a workflow showing an example boiler data validation procedure, according to some implementations.

FIG. 7 is a workflow showing an example boiler data validation procedure 700. For boiler data validation and reconciliation, the PI raw data for boiler steam, BFW, fuel flow rates and stack temperature are received. A validation step is implemented to identify if the boiler is running or not. This step is based on if the flue gas (stack) temperature is less than 150° F. If yes, then the boiler is off and zero is reported for the flow rate. If the boiler is running, then another cross check is performed based on steam, fuel and BFW flow rates and boiler efficiency. If the determined boiler efficiency based on heat input/output method is greater than 90%, then the correlation equation (below) is used to calculate the boiler efficiency, and the fuel value is adjusted accordingly. If the efficiency is within range, then the fuel consumption is validated based on the expected and actual values. If the error is within 2%, then the fuel value is used as is or adjusted to be within 2% error. The inputs for the boiler's efficiency correlation equation are the stack temperature (Stack Temp, ° F.) and excess oxygen (Excess $O_2$, %). Both are collected from PI data. The correlation parameter (AO2, BO2, AT, BT) are generated for each specific boiler and updated periodically, for example, at a frequency of once per year or once per a different time duration.

$$Eff = (AO2 * \text{Excess } O2 + BO2) * (1 - AT * \text{Stack Temp}) +$$
$$BT * \text{Stack Temp}$$

Figure 8:
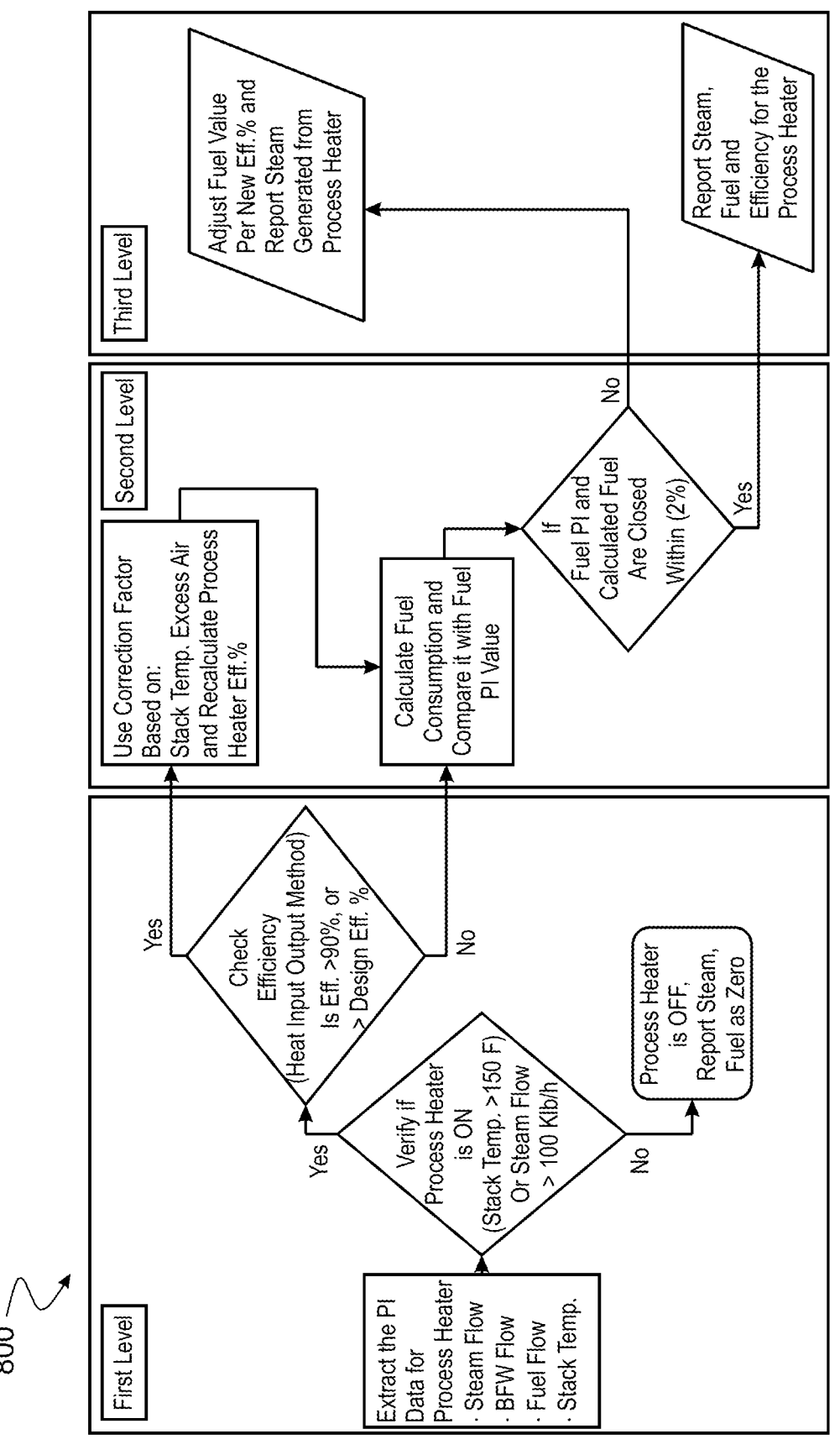
FIG. 8 illustrates a workflow showing an example process heater data validation procedure, according to some implementations.

FIG. 8 is a workflow showing an example process heater data validation procedure 800. The validation procedure 800 (PH-DVR) is part of the industrial plant 100 online CHP model. A process heater can be in the form of a furnace or waste heat boiler. For this unit, PI data is extracted for generated steam, BFW, fuel flow rates and stack temperature. Then, a validation step is implemented to identify if the boiler is running or not. This step is based on if the flue gas (stack) temperature is less than 150° F. If yes, then the process heater is off and zero is reported for the flow rate. If the process heater is running, then another cross check is performed based on steam, fuel and BFW flow rates and boiler efficiency. If the determined boiler efficiency based on heat input/output method is greater than 90%, then the correlation equation (below) is used to calculate the boiler efficiency, and the fuel value is adjusted accordingly. If the efficiency is within range, then the fuel consumption is validated based on the expected and actual values. If the error is within 2%, then the fuel value is used as is or adjusted to be within 2% error. The inputs for the boiler's efficiency correlation equation are the stack temperature (Stack Temp, ° F.) and excess oxygen (Excess $O_2$, %). Both are collected from PI data. The correlation parameter (AO2, BO2, AT, BT) are generated for each specific boiler and updated periodically, for example, at a frequency of once per year or once per a different time duration.

$$Eff = (AO2 * \text{Excess } O2 + BO2) * (1 - AT * \text{Stack Temp}) +$$
$$BT * \text{Stack Temp}$$

Figure 9:
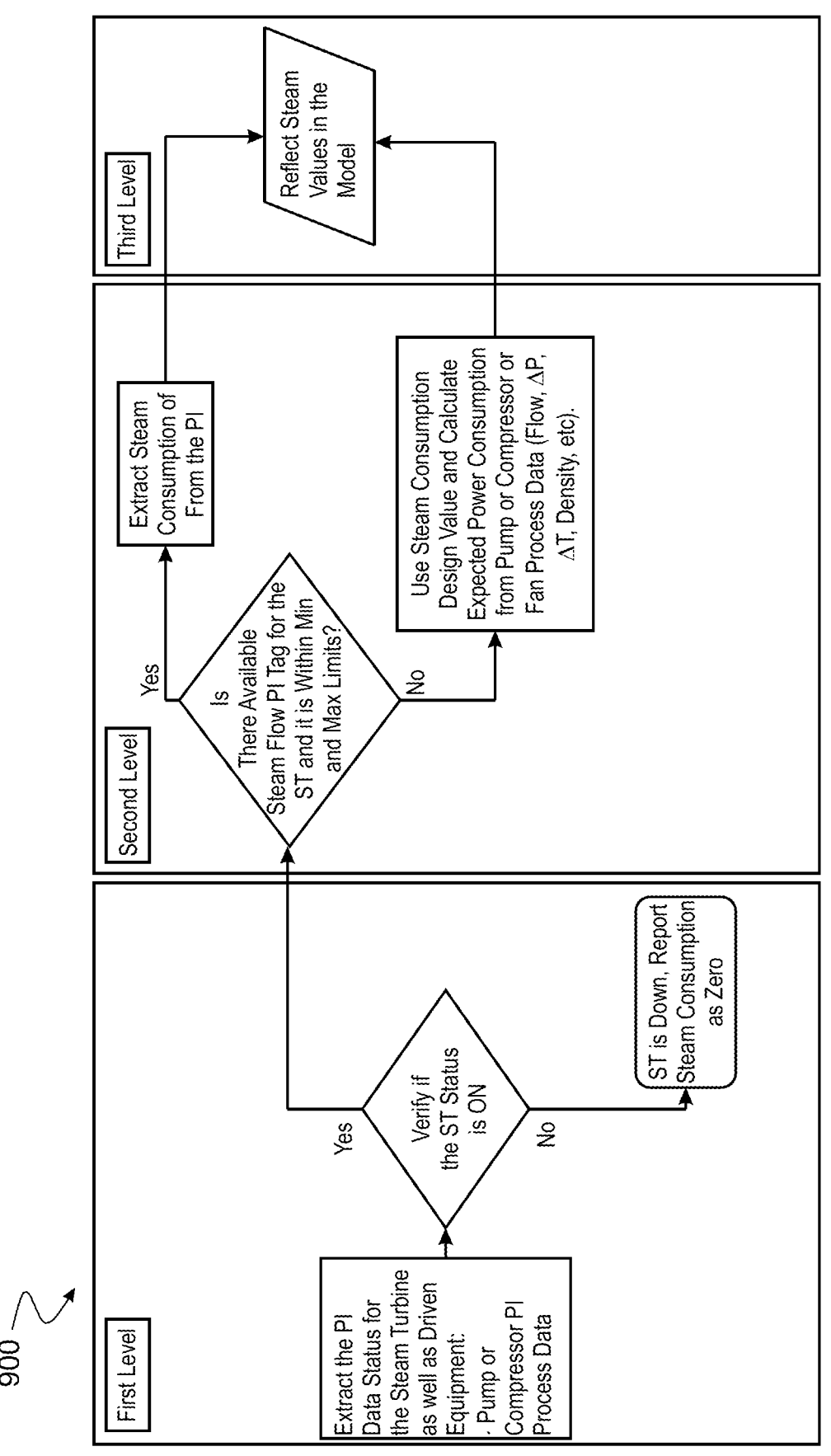
FIG. 9 illustrates a workflow showing data validation procedures for mechanical drivers and power generators, according to some implementations.

FIG. 9 is a workflow showing data validation procedures 900 for mechanical drivers and power generators. The data validation procedure 900 (ST-DVR) covers mechanical driven equipment such as compressors, pumps, air blowers and the like. Such turbines typically operate at speeds relative to the driven process equipment. For the mechanical drivers and power generators, PI data is retrieved for the various stages of the steam turbine (i.e., admission, extraction, induction and the like), RPM and the driven process stream flow. Then, a validation step is performed to identify if the unit is running or not. This is based on if the RPM is less than the design range of operation. If the mechanical drivers and power generators are running, then another cross check is performed based on the steam flow rate. The steam turbine efficiency is based on actual operation versus isentropic operation extracted from steam temperatures from the turbine. If there is a steam flow PI-tag for the steam passing to the steam turbine and the value is within minimum and maximum ranges, then the value will be used on the model. If there is no steam reading or the reading is outside the minimum and maximum ranges, then a correlation is used to quantify the expected steam consumption based on process parameters related to the steam turbines or a design value is used. Then, this value is subject to variations by the data reconciliation layer within acceptable ranges.

Figure 10:
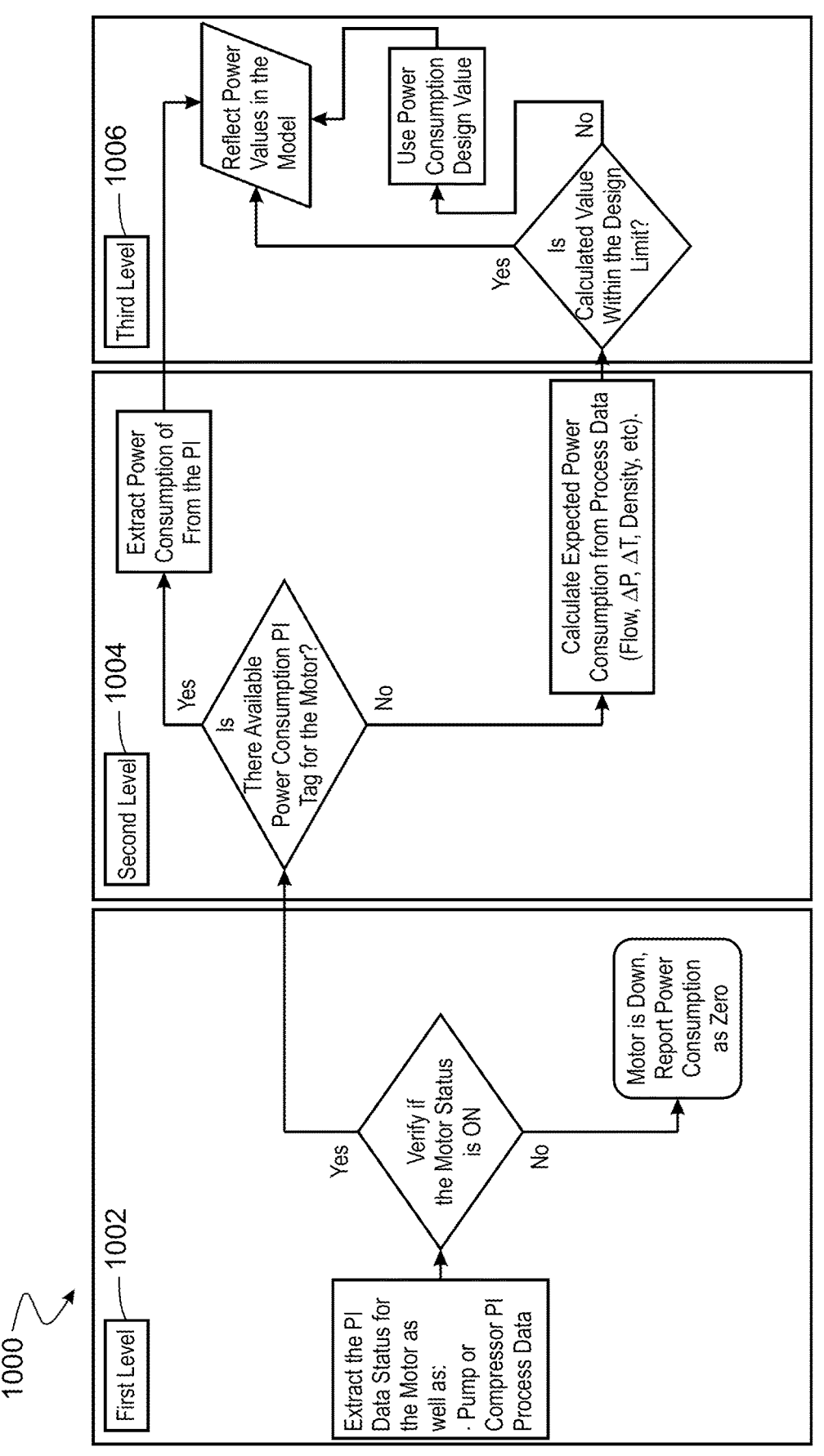
FIG. 10 illustrates a workflow showing motor-pump/ compressor data validation procedure, according to some implementations.

FIG. 10 is a workflow showing motor-pump/compressor data validation procedure 1000. The motors include all the facility motors driving all pumps and compressors. The data validation procedure 1000 (MT-DVR) includes three levels of validation and reconciliation. In the first level 1002, the status of the motor is extracted from the PI to check if the motor is ON or OFF. If the motor is OFF, then the power consumption of the motor is considered to be zero. If the motor is ON, then the second level 1004 of validation is implemented. In the second level 1004, a check is performed if there is available power consumption PI tag. The power consumption data is extracted from the PI system if there is an available motor power consumption PI tag. If the motor power consumption PI tag is unavailable, the motor power consumption is determined based on other process parameters for pumps (e.g., pressure differential, flow, temperature differential, specific density and the like). In the last validation level 1006, if the determined value is not within the design limit due to fault reading in one other used process parameters, then the motor power consumption design rate is used as a user default value.

Figure 11:
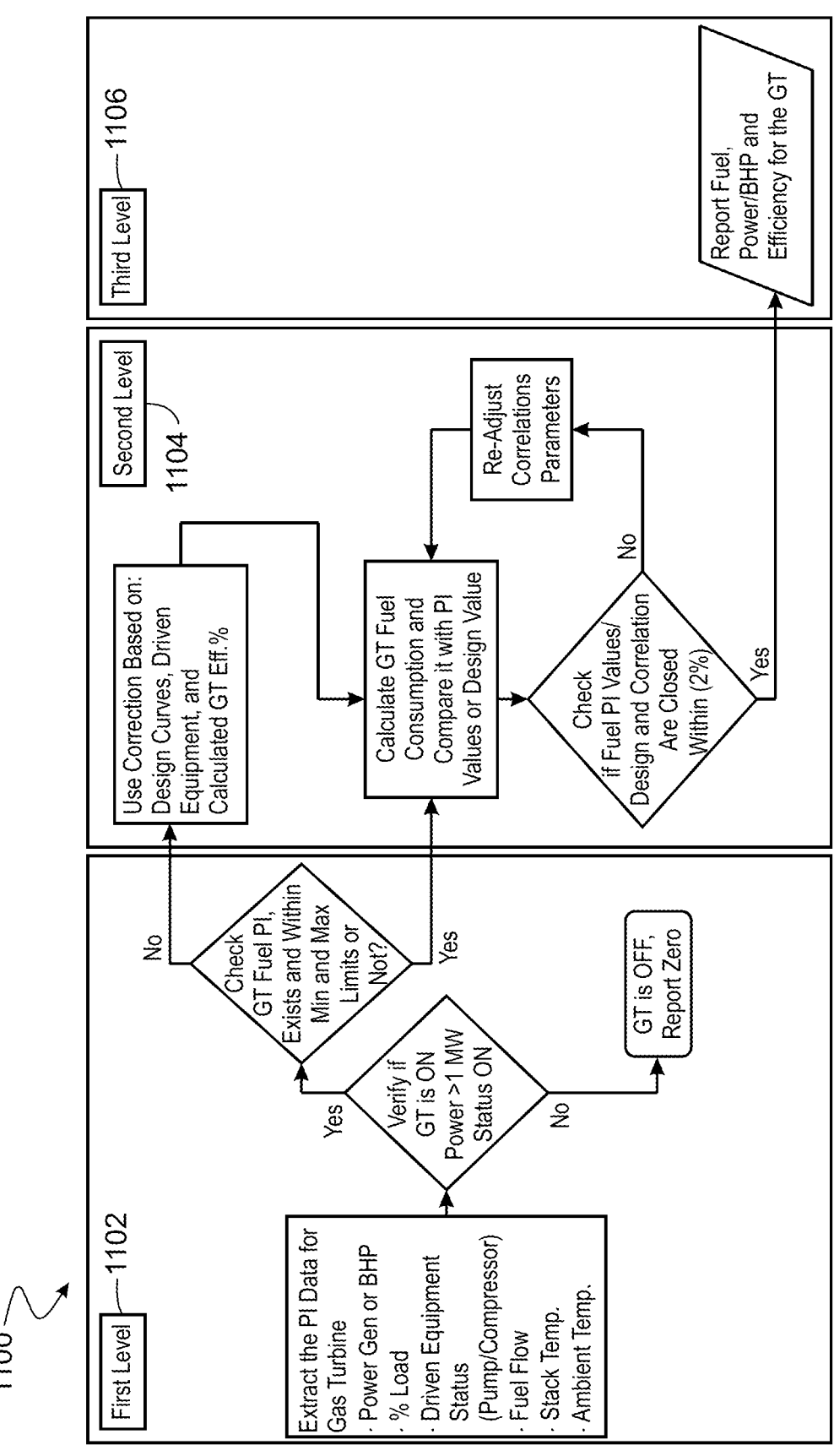
FIG. 11 illustrates a workflow showing gas turbine data validation procedure, according to some implementations.

FIG. 11 is a workflow showing gas turbine data validation procedure 1100 (GT-DVR). The procedure 1100 is implemented in three levels of data validation and reconciliation. Key measurements from a DCS pertaining to a simple cycle gas turbine unit are used as inputs to determine the current operational condition of the gas turbine. In the first level 1102, the gas turbine status is checked to see if it is online or offline. The electrical power generation or mechanical driven unit (e.g., pump or compressor) is used to check if the unit is operational. The power limits where the gas turbine unit is considered to be online is typically based on design data or historical data or a combination of both. At the second level 1104, interrelated variables are reconciled together to make sure that measured and reconciled parameters are within 2% error. The extracted power, fuel flow and stack temperature values are bound within reasonable lower and upper limits. If the extracted data from PI is within set limits, then the PI value reading is reflected in the model. If the PI reading is out of the minimum and maximum limitations, then the PI value reading based on design data or historical data or a combination of both are used. If the correlated value is within the minimum and maximum limitations, then it is reflected in the model. At the end of the validation procedure, if the correlated value is not within the minimum and maximum limitations, then the design value is used. The last level of validation (level 1106) ensures that the reported values in the model leads to a close balance.

$$\text{Gas Turbine Efficiency } (\%) = BHP \text{ output of driven equipment or } MW$$
$$\text{output/Fuel consumption by gas turbine unit}$$

Each of the data validation procedures described earlier is implemented by the computer system 104 as computer-executable instructions. Subsequently, the computer system 104 implements an overall steam system data reconciliation to ensure closing balance in the most accurate way possible. The computer system 104 implements the steam system data validation and reconciliation for closing balance subject to the following points:

1. PI data related to the following variables will be maintained as-is for establishing the base-case:
        a. Boilers steam production
        b. Cogen system steam and power production c. Letdown steam flow d. Excess steam flow 2. Adjustment will be made to steam process users that has PI issues or high errors, and the adjustment will follow the procedure identified for each equipment flow-chart.

3. The adjustment factor for each steam user is a decision variable for an optimization layer that aims to close the individual header balance as well as the overall system steam balance.

Problem formulation for error minimization and closing balance on each other header and overall steam system is implemented by the computer system 104 by executing the following equation:

Objective function =

$$\text{Min Headers Errors} \sum_1^n \text{Header\_n(SteamIn - SteamOut)},$$

subject to the following constraints:

Keeping steam from boilers unchanged,

Cogen steam and power production unchanged,

Letdown station flows unchanged,

Equipment steam consumption will be adjusted between minimum and maximum limits, according to specific flow chart for each equipment/user.

In some implementations, the computer system 104 implements an optimization layer that provides advisory recommendations to adjust loading of major equipment in the operating facilities which helps to improve steam and power system efficiency and reduce carbon dioxide emissions. The computer system 104 implements the optimization by executing an objective function subject to variables and constraints. The objective function aims to minimize facility operating cost, which includes fuel cost, power import and export cost and make-up water and water treatment costs. The variables in the optimization include steam and power loading of major equipment in the steam systems, e.g., all the equipment for which validation procedures were described above. The optimization is subject to several constraints representing the operational and equipment limitations. Examples include:

Meeting all steam and power demand of the facility,

Steam, power, fuel, and water requirement subject to contractual agreement with a $3^{rd}$ party or a joint vendor, Environmental regulations on carbon dioxide emissions or similar requirement, Energy and material balance of the steam and power network within the facility, Equipment maximum and minimum output limitations, Non-negative flows in the steam distribution network, Steam and power reserve required by the facility, Minimum number of running equipment to satisfy reliability requirement as applicable.

Figure 12:
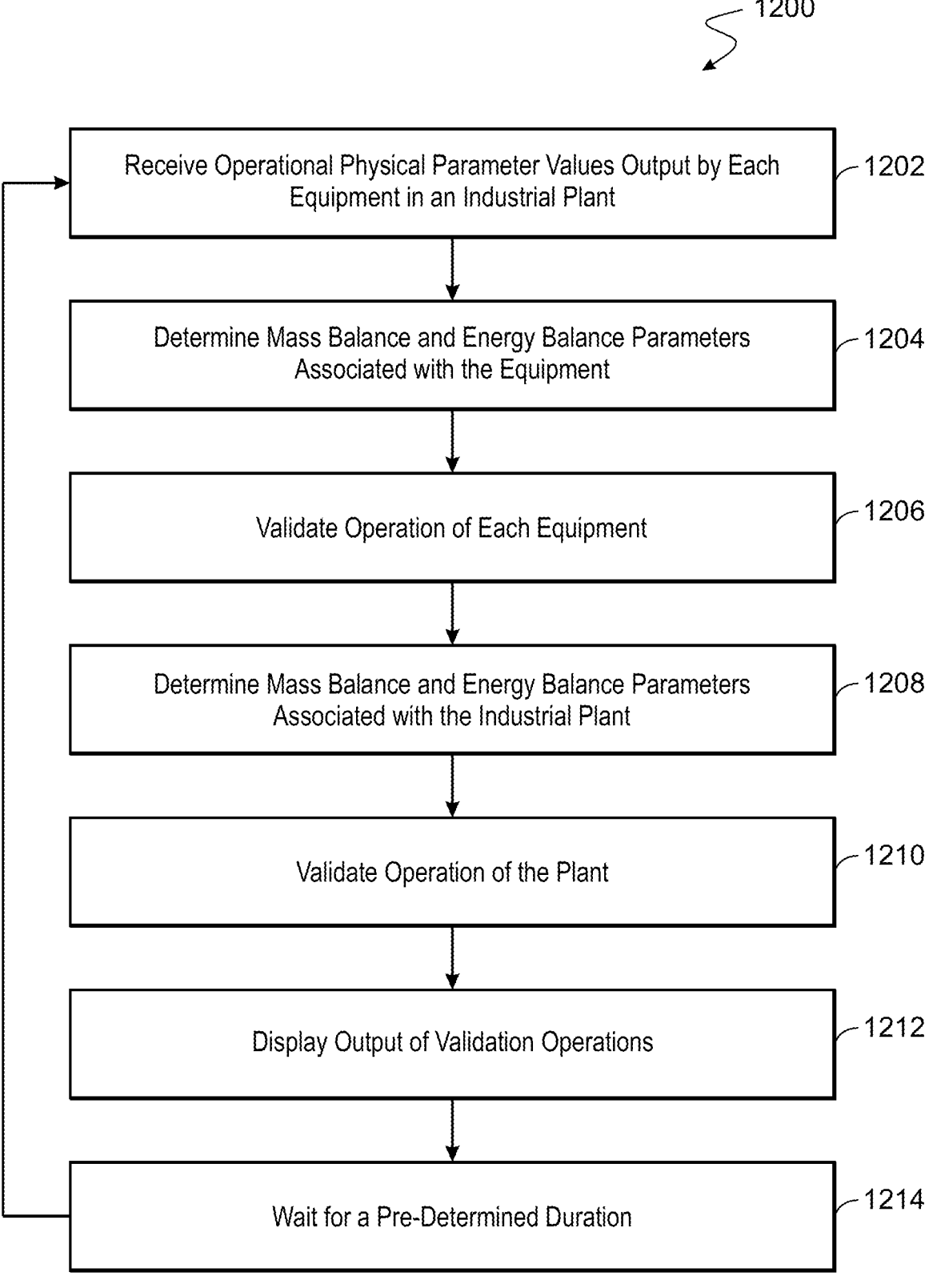
FIG. 12 illustrates a flowchart of an example method of data validation and optimization of the industrial steam power and utility system, according to some implementations.

FIG. 12 is a flowchart of an example of a method 1200 of data validation and optimization of the industrial steam power and utility system. The method 1200 is implemented by a computer system (e.g., computer system 104) in an industrial plant (e.g., industrial plant 100) implementing steam and power systems. The industrial plant includes multiple equipment including a cogeneration system and a steam turbine. At 1202, for each equipment, the computer system receives (during operation of each equipment), measured operational physical parameter values output by the equipment during the operation of the equipment. At 1204, the computer system 104 determines mass balance and energy balance parameters associated with the equipment using the received operational physical parameter values. At 1206, the computer system 104 validates an operation of the equipment using the determined mass balance and energy balance parameters. After validating mass balance and energy balance parameters for the multiple equipment, at 1208, the computer system 104 determines mass balance and energy balance parameters associated with the industrial plant using the mass balance and energy balance parameters for each equipment. At 1210, the computer system 104 validates an operation of the industrial plant using the determined mass balance and energy balance parameters associated with the industrial plant. At 1212, the computer system 104 displays output of validation operations. At 1214, the computer system waits for a pre-determined duration (e.g., one hour, or less than or more than one hour), and repeats steps 1202-1212. The validation solution implemented by the computer system 104 eliminates faulty readings and ensures an accurate representation of the operating facilities' steam and power utility systems.

In some implementations, the real-time advisory system includes a layer for multi-site optimization that performs power generation fleet optimization and/or load management at an enterprise level (e.g., across multiple sites within an enterprise or sector). This optimization layer looks after overall power generation fleets of multiple sites within an enterprise. The optimization layer provides advisory recommendations to adjust loading of power generation fleets and boilers load management per site. The objective function of this layer is to improve (e.g., optimize) operating cost, system efficiency, $CO_2$ emission reduction. This optimization layer also includes constraints for site specific operational limitations.

Figure 13:
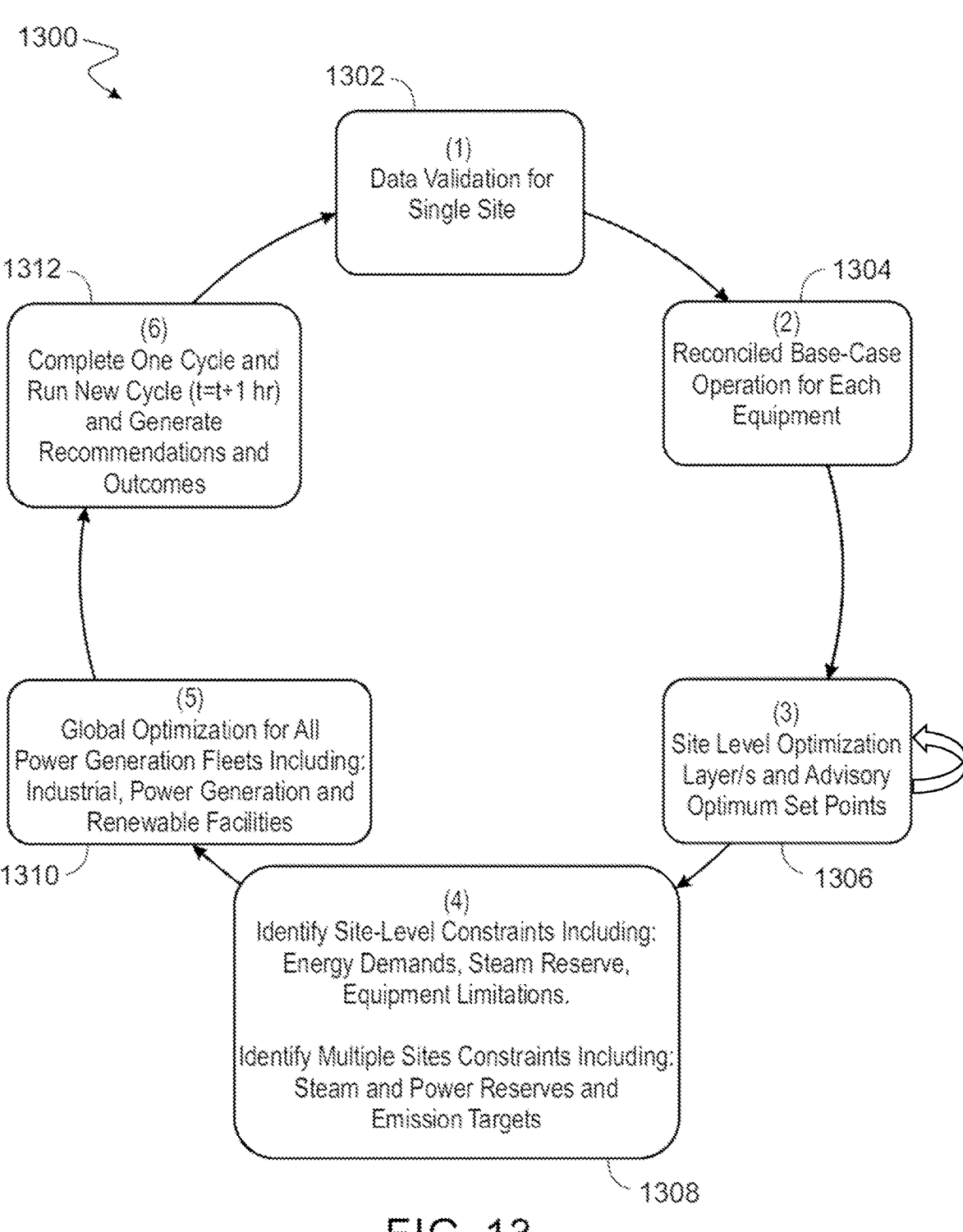
FIG. 13 illustrates a schematic representation of multi-site optimization operations, according to some implementations.

FIG. 13 illustrates a schematic representation of multi-site optimization operations 1300, according to some implementations. The multi-site optimization operations 1300 can be performed by a multi-site optimization system, such as a Project Management Information System (PMIS). Specifically, the multi-site optimization system can periodically perform the multi-site optimization operations 1300 to optimize the operations of industrial steam power and utility systems at a plurality of facilities. FIG. 13 shows that the optimization operations are cyclical.

At step 1302, the multi-site optimization system implements data validation operations for one or more sites. In some examples, step 1302 involves implementing data validation operations for each equipment at each site. The process of implementing data validation operations for each equipment is described in step 302 of FIG. 3.

At step 1304, the multi-site optimization system reconciles a base-case operation for each equipment. The process of reconciling a base-case operation for each equipment data is described in step 304 of FIG. 3.

At step 1306, the multi-site optimization system implements optimization and identifies advisory optimum set points for each site. The process of implementing optimization and identifying advisory optimum set points for a site is described in step 306 of FIG. 3. Note that the multi-site optimization system performs the site level optimization for the sites sequentially or simultaneously.

At step 1308, the multi-site optimization system identifies site-level constraints including: energy demands, steam reserve, equipment limitations. Additionally, the multi-site optimization system identifies multi-site constraints including steam and power reserves and emission targets.

At step 1310, the multi-site optimization system performs global optimization for all power generation fleets including: industrial, power generation, and renewable facilities. To optimize the energy system in a single site, the real-time advisory system considers several constraints, such as: (i) the closing material and energy balances for a base-case operation and for an optimized operation of the energy system at the site, (ii) equipment minimum and maximum operating limits at the site, and (iii) steam and power reserve requirements of the energy system at the site. And to optimize multiple sites, the real-time advisory system considers constraints for global optimization, such as: (i) generating specific power output values across the facilities, and (ii) site level and multi-site level constraints, such as equipment operating limits.

In some implementations, the multi-site optimization system generates a global matrix of the results from the optimization of each site. The results of the optimization of each site include the equipment that is ON/OFF, the optimized steam loading of the equipment that is operating, and power loading of the equipment that is operating, among other data described herein. Then, the multi-site optimization system uses the matrix (e.g., to initialize the optimization function), a global objective function, decision variables for the global objection function, and constraints to perform the multi-site optimization. Using the matrix of the site level optimizations for initialization can facilitate converging to the optimal solution more quickly and efficiently. In some examples, the objective of the objective function is to minimize a total operating cost across the enterprise. The total operating costs includes fuel costs, power import costs, power export costs, make-up water costs, and water treatment costs. In some examples, the decision variables in the optimization include, but are not limited to, steam and power loading of cogen, power generation, water desalination, and renewables. In some examples, the multi-site optimization is subject to one or more constraints representing the operational and equipment limitations such as:

Meeting the steam and power demands of each facility while meeting the demands across the multiple sites;

Steam, power, fuel, and water requirements subject to contractual agreements with third parties;

Environmental regulations on $CO_2$ emissions or similar requirements;

The energy and material balance of the steam and power network within each facility;

Equipment maximum and minimum output limitations;

Non-negative flows in the steam distribution network;

Steam and power reserves required by each facility;

Minimum numbers of running equipment to satisfy reliability requirement as applicable. This may include forcing certain equipment off during transport and installation (T&I).

In some implementations, once the optimization operation is complete, the multi-site optimization system provides advisory recommendations to adjust loading of major equipment in the operating facilities, which helps to improve steam and power system efficiency and reduce carbon dioxide emissions, thereby reducing the overall operational cost. In particular, based on the multi-site optimization, the multi-site optimization system can perform cogen load management (identifying which units to be ON/OFF), boilers load management, and excess steam minimization. In addition to recommending actions for cogen load management, boilers load management, and excess steam minimization, the multi-site optimization system can also determine the benefits of performing each action. Both the actions to be performed and the benefits can be provided on a user interface.

At step 1312, the multi-site optimization system repeats the cycle of steps 1302, 1304, 1306, 1308, and 1310. In some implementations, the multi-site optimization system can repeat the cycle at a frequency, for example, once per hour, or once per a different duration that can be varied in response to user input. In this manner, the multi-site optimization system can periodically monitor the multi-site facilities, both at an equipment level and at a system-wide level, implement validation and optimization measures, and provide outputs of the validation and optimization for display in a user interface.

In some implementations, a user interface includes recommended actions to achieve optimization across multiple facilities. Specifically, the user interface depicts recommendations for a particular facility of the multiple facilities. The recommendations can include the boilers to turn on/off (e.g., Boiler 1 is ON and Boiler 2 is OFF), the cogens to turn off/on, and the operating parameters for various equipment, including steam producers, deaerators, and steam turbines. The user interface depicts the benefits achieved from the recommended actions. For instance, the user interface includes a comparison of operating cost, steam system efficiency, and CO2 emission reduction for a base-line case and optimized case.

The user interface can also include recommended operating parameters for equipment at a facility. The recommended operating parameters include recommended loads for cogens and boilers. Additionally, the recommended operating parameters include an indication of the air blowers to turn on/off. Furthermore, the user interface includes a representation of the benefits of the recommended actions. The user interface includes graphs that depict the cost improvements, system efficiency improvements, and KPI improvements.

Figure 14:
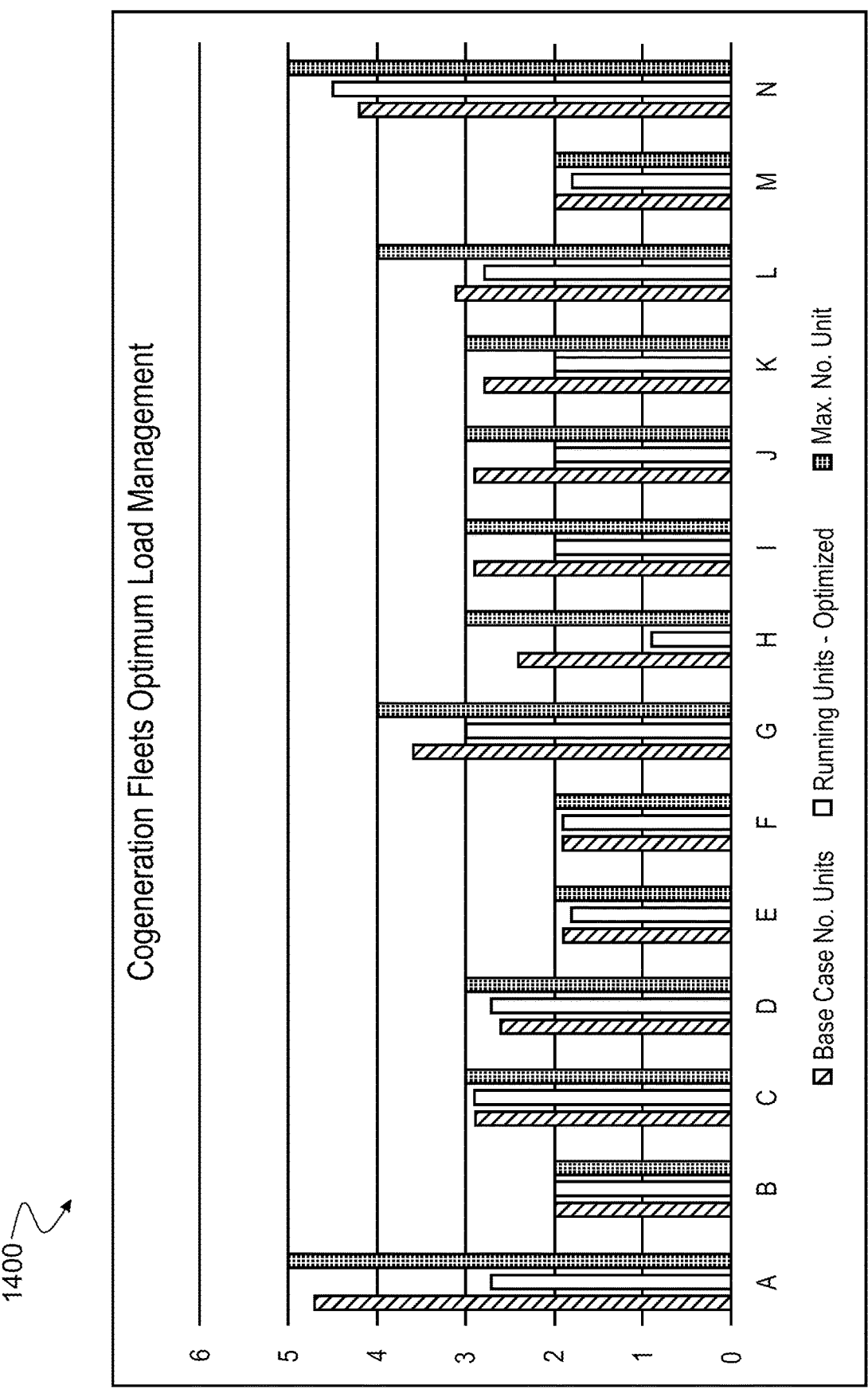
FIG. 14 illustrates a graph of optimized cogeneration fleet operation, according to some implementations.

FIG. 14 illustrates a graph 1400 of optimized cogeneration fleet operation, according to some implementations. The graph 1400 is another example of the recommended actions by the multi-site optimization system in order to achieve optimization. In this example, A-N each refer to a facility. As shown in FIG. 14, the graph 1400 depicts: (i) a base-case no. units operated at each facility, (ii) a maximum no. of units at that facility, and (iii) an optimized no. of units based on the multi-site optimization operation.

Figure 15:
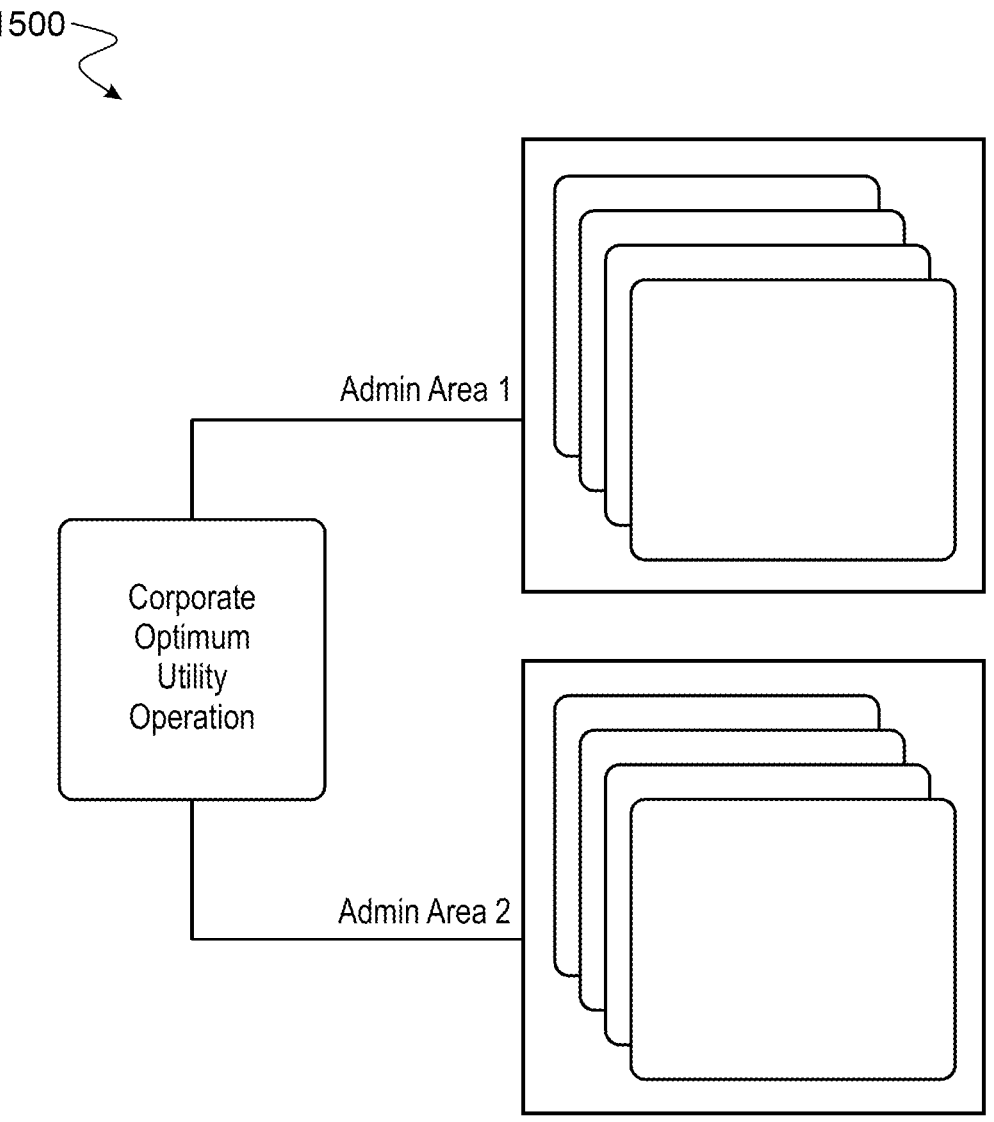
FIG. 15 illustrates a depiction of a multi-site optimization system, according to some implementations.

FIG. 15 illustrates a depiction of a multi-site optimization system 1500, according to some implementations. As shown in FIG. 15, the results of a multi-site optimization operations (shown as corporate optimum utility operation) can be accessed from multiple admin areas, e.g., admin areas at different facilities. The results of the multi-site optimization operations include (i) a base-case no. units operated at each facility, (ii) a maximum no. of units at that facility, and (iii) an optimized no. of units based on the multi-site optimization operation. Further, each facility can access recommendations to adjust loading of major equipment in at that facility, which helps to improve steam and power system efficiency and reduce carbon dioxide emissions. Further, each facility can use the information displayed on the graphical user interface to perform cogen load management (identifying which units to be ON/OFF), boilers load management, and excess steam minimization.

FIG. 16 is a flowchart of an example of a method 1600 of multi-site optimization of a plurality of energy systems (e.g., industrial steam power and utility systems) in multiple facilities. The method 1600 is implemented by a computer system (e.g., computer system 1700) that manages the plurality of energy systems. Each of the energy systems includes a plurality of power generation equipment, such as cogeneration systems and steam turbines.

At 1602, method 1600 involves for each energy system at each facility: performing equipment level data validation for the plurality of respective power generation equipment; performing equipment level data reconciliation for the plurality of respective power generation equipment; and performing site-level optimization to determine equipment operating parameters for the plurality of respective power generation equipment.

At 1604, method 1600 involves determining: (i) site-level constraints for the plurality of energy systems, and (ii) multi-site constraints across the plurality of energy systems.

At 1606, method 1600 involves optimizing, based on the site-level constraints and the multi-site constraints, the equipment operating parameters for the plurality of respective power generation equipment across the plurality of energy systems.

In some implementations, the plurality of energy systems include an industrial plant, a power generation plant, and a renewable energy plant.

In some implementations, the site-level constraints include energy demands of each energy system, a respective steam reserve for each energy system, a respective minimum number of boilers needed to maintain the respective steam reserve for each energy system, and equipment limitations of the plurality of respective power generation equipment for each energy system.

In some implementations, the multi-site constraints include a steam reserve requirement across the plurality of energy systems, a power reserve requirement across the plurality of energy systems, an emission reduction target across the plurality of energy systems, and a minimum efficiency across the plurality of energy systems.

In some implementations, performing equipment level data validation for the plurality of respective power generation equipment involves: for each equipment of the plurality of power generation equipment: receiving, during operation of each equipment, measured operational physical parameter values output by the equipment during the operation of the equipment; determining, using the received operational physical parameter values, mass balance and energy balance parameters associated with the equipment; and validating an operation of the equipment using the determined mass balance and energy balance parameters.

In some implementations, optimizing, based on the site-level constraints and the multi-site constraints, the equipment operating parameters for the plurality of respective power generation equipment involves generating a global matrix that comprises site-level optimization results of each energy system; and using a global objective function and the global matrix of site-level optimization results to optimize the equipment operating parameters for the plurality of respective power generation equipment.

In some implementations, the operating parameters include cogeneration load management and boilers load management.

In some implementations, the method further involves displaying, via a user interface, the operating parameters on a display device; and displaying, via the user interface, benefits associated with the operating parameters on the display device.

Figure 17:
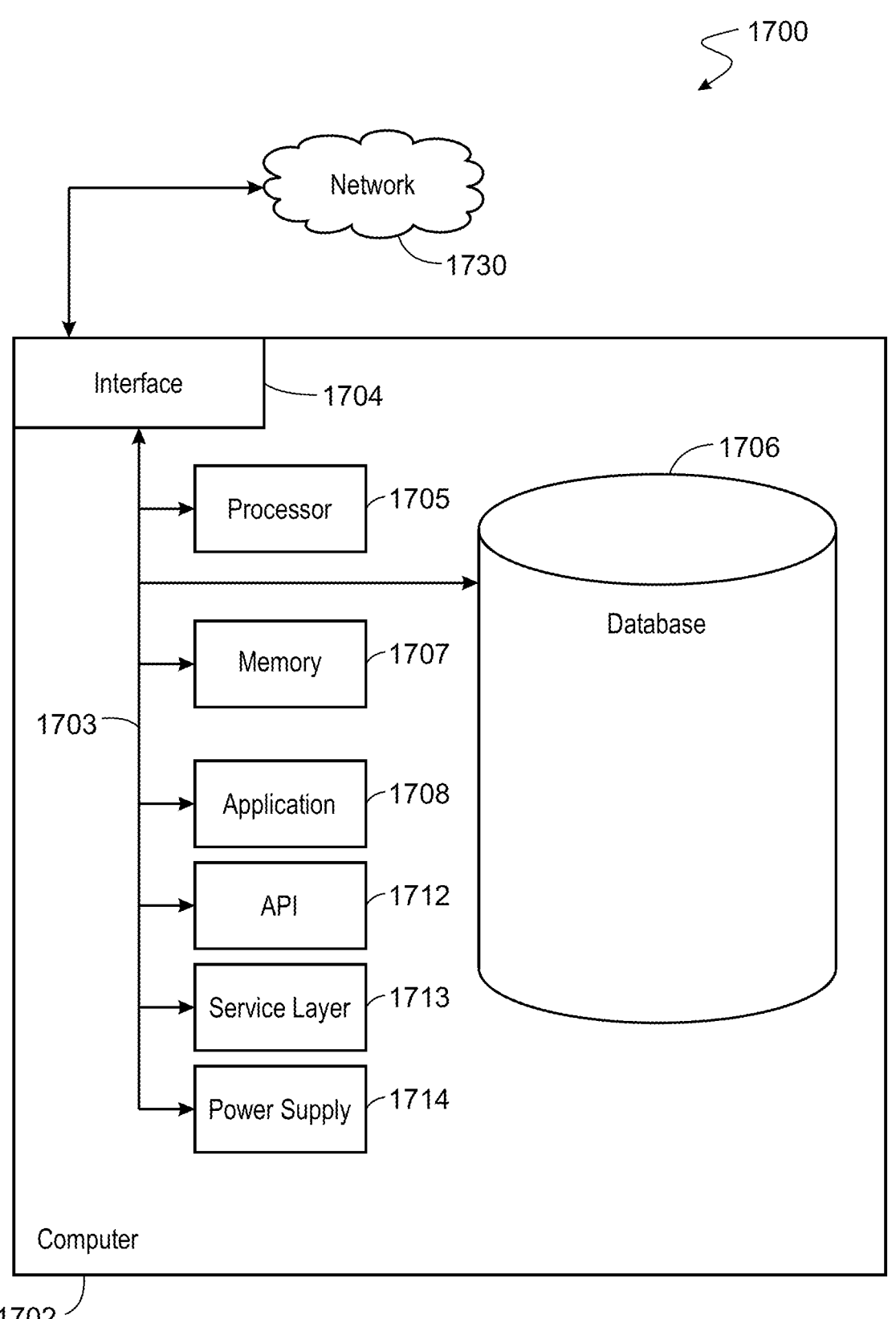
FIG. 17 is a block diagram of an example computer system used to provide computational functionalities associated with described algorithms, methods, functions, processes, flows, and procedures described in the present disclosure.

FIG. 17 is a block diagram of an example computer system 1700 (e.g., computer system 104) used to provide computational functionalities associated with described algorithms, methods, functions, processes, flows, and procedures described in the present disclosure, according to some implementations of the present disclosure. The illustrated computer 1702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1702 can include input devices such as keypads, keyboards, and touch screens that can accept user information. Also, the computer 1702 can include output devices that can convey information associated with the operation of the computer 1702. The information can include digital data, visual data, audio information, or a combination of information. The information can be presented in a graphical user interface (UI) (or GUI).

The computer 1702 can serve in a role as a client, a network component, a server, a database, a persistency, or components of a computer system for performing the subject matter described in the present disclosure. The illustrated computer 1702 is communicably coupled with a network 1730. In some implementations, one or more components of the computer 1702 can be configured to operate within different environments, including cloud-computing-based environments, local environments, global environments, and combinations of environments.

At a top level, the computer 1702 is an electronic computing device operable to receive, transmit, process, store, and manage data and information associated with the described subject matter. According to some implementations, the computer 1702 can also include, or be communicably coupled with, an application server, an email server, a web server, a caching server, a streaming data server, or a combination of servers.

The computer 1702 can receive requests over network 1730 from a client application (for example, executing on another computer 1702). The computer 1702 can respond to the received requests by processing the received requests using software applications. Requests can also be sent to the computer 1702 from internal users (for example, from a command console), external (or third) parties, automated applications, entities, individuals, systems, and computers.

Each of the components of the computer 1702 can communicate using a system bus 1703. In some implementations, any, or all of the components of the computer 1702, including hardware or software components, can interface with each other or the interface 1704 (or a combination of both) over the system bus 1703. Interfaces can use an application programming interface (API) 1712, a service layer 1713, or a combination of the API 1712 and service layer 1713. The API 1712 can include specifications for routines, data structures, and object classes. The API 1712 can be either computer-language independent or dependent. The API 1712 can refer to a complete interface, a single function, or a set of APIs.

The service layer 1713 can provide software services to the computer 1702 and other components (whether illustrated or not) that are communicably coupled to the computer 1702. The functionality of the computer 1702 can be accessible for all service consumers using this service layer. Software services, such as those provided by the service layer 1713, can provide reusable, defined functionalities through a defined interface. For example, the interface can be software written in JAVA, C++, or a language providing data in extensible markup language (XML) format. While illustrated as an integrated component of the computer 1702, in alternative implementations, the API 1712 or the service layer 1713 can be stand-alone components in relation to other components of the computer 1702 and other components communicably coupled to the computer 1702. Moreover, any or all parts of the API 1712 or the service layer 1713 can be implemented as child or sub-modules of another software module, enterprise application, or hardware module without departing from the scope of the present disclosure.

The computer 1702 includes an interface 1704. Although illustrated as a single interface 1704 in FIG. 17, two or more interfaces 1704 can be used according to particular needs, desires, or particular implementations of the computer 1702 and the described functionality. The interface 1704 can be used by the computer 1702 for communicating with other systems that are connected to the network 1730 (whether illustrated or not) in a distributed environment. Generally, the interface 1704 can include, or be implemented using, logic encoded in software or hardware (or a combination of software and hardware) operable to communicate with the network 1730. More specifically, the interface 1704 can include software supporting one or more communication protocols associated with communications. As such, the network 1730 or the interface's hardware can be operable to communicate physical signals within and outside of the illustrated computer 1702.

The computer 1702 includes a processor 1705. Although illustrated as a single processor 1705 in FIG. 17, two or more processors 1705 can be used according to particular needs, desires, or particular implementations of the computer 1702 and the described functionality. Generally, the processor 1705 can execute instructions and can manipulate data to perform the operations of the computer 1702, including operations using algorithms, methods, functions, processes, flows, and procedures as described in the present disclosure.

The computer 1702 also includes a database 1706 that can hold data for the computer 1702 and other components connected to the network 1730 (whether illustrated or not). For example, database 1706 can be an in-memory, conventional, or a database storing data consistent with the present disclosure. In some implementations, database 1706 can be a combination of two or more different database types (for example, hybrid in-memory and conventional databases) according to particular needs, desires, or particular implementations of the computer 1702 and the described functionality. Although illustrated as a single database 1706 in FIG. 17, two or more databases (of the same, different, or combination of types) can be used according to particular needs, desires, or particular implementations of the computer 1702 and the described functionality. While database 1706 is illustrated as an internal component of the computer 1702, in alternative implementations, database 1706 can be external to the computer 1702.

The computer 1702 also includes a memory 1713 that can hold data for the computer 1702 or a combination of components connected to the network 1730 (whether illustrated or not). Memory 1713 can store any data consistent with the present disclosure. In some implementations, memory 1713 can be a combination of two or more different types of memory (for example, a combination of semiconductor and magnetic storage) according to particular needs, desires, or particular implementations of the computer 1702 and the described functionality. Although illustrated as a single memory 1713 in FIG. 17, two or more memories 1713 (of the same, different, or combination of types) can be used according to particular needs, desires, or particular implementations of the computer 1702 and the described functionality. While memory 1713 is illustrated as an internal component of the computer 1702, in alternative implementations, memory 1713 can be external to the computer 1702.

The application 1708 can be an algorithmic software engine providing functionality according to particular needs, desires, or particular implementations of the computer 1702 and the described functionality. For example, application 1708 can serve as one or more components, modules, or applications. Further, although illustrated as a single application 1708, the application 1708 can be implemented as multiple applications 1708 on the computer 1702. In addition, although illustrated as internal to the computer 1702, in alternative implementations, the application 1708 can be external to the computer 1702.

The computer 1702 can also include a power supply 1714. The power supply 1714 can include a rechargeable or non-rechargeable battery that can be configured to be either user- or non-user-replaceable. In some implementations, the power supply 1714 can include power-conversion and management circuits, including recharging, standby, and power management functionalities. In some implementations, the power supply 1714 can include a power plug to allow the computer 1702 to be plugged into a wall socket or a power source to, for example, power the computer 1702 or recharge a rechargeable battery.

There can be any number of computers 1702 associated with, or external to, a computer system containing computer 1702, with each computer 1702 communicating over network 1730. Further, the terms "client," "user," and other appropriate terminology can be used interchangeably, as appropriate, without departing from the scope of the present disclosure. Moreover, the present disclosure contemplates that many users can use one computer 1702 and one user can use multiple computers 1702.

For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec, less than 5 secs, etc. In another example, the time difference for a response to transmit a measured value (e.g., to be displayed or to be processed) following measurement of the value may be less than 1 ms, less than 1 sec, less than 5 secs, etc. While the requested data need not be: displayed (or initiated for display) or the operation be performed instantaneously, it is displayed (or initiated for display) or the operation is performed without any intentional delay, taking into account processing limitations of a described computing system and time required to, for example, gather, accurately measure, analyze, process, store, or transmit (or a combination of these or other functions) the data.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An industrial plant comprising a computer system managing a plurality of energy systems located in a plurality of facilities, the computer system being configured to perform operations comprising:

for each energy system of the plurality of energy systems at each facility of the plurality of facilities: receiving, from one or more sensors a respective power generation equipment included in a respective energy system, equipment operating parameters;

performing equipment level data validation for the respective power generation equipment by processing the equipment operating parameters relative to an operational status of the respective power generation equipment, to generate validated equipment level data;

performing equipment level data reconciliation for the respective power generation equipment by processing the validated equipment level data relative to acceptable equipment level ranges, to generate reconciled equipment level data; and performing site-level optimization, using the reconciled equipment level data, to determine calibrated equipment operating parameters for the respective power generation equipment;

determining: (i) site-level constraints for the plurality of energy systems, and (ii) multi-site constraints across the plurality of energy systems; and updating, by activating equipment switches, operational states of one or more power generation equipment for optimizing, based on the site-level constraints and the multi-site constraints, the calibrated equipment operating parameters for the respective power generation equipment across the plurality of energy systems.

2. The industrial plant of claim 1, wherein the industrial plant comprises a power generation plant, and a renewable energy plant.

3. The industrial plant of claim 1, wherein the site-level constraints comprise energy demands of each energy system, a respective steam reserve for each energy system, a respective minimum number of boilers needed to maintain the respective steam reserve for each energy system, and equipment limitations of the respective power generation equipment for each energy system.

4. The industrial plant of claim 1, wherein the multi-site constraints comprise a steam reserve requirement across the plurality of energy systems, a power reserve requirement across the plurality of energy systems, an emission reduction target across the plurality of energy systems, and a minimum efficiency across the plurality of energy systems.

5. The industrial plant of claim 1, wherein performing equipment level data validation for the respective power generation equipment comprises:

for each equipment of the plurality of power generation equipment:

receiving, during operation of each equipment, measured operational physical parameter values output by the equipment during the operation of the equipment;

determining, using the received operational physical parameter values, mass balance and energy balance parameters associated with the equipment; and validating an operation of the equipment using the determined mass balance and energy balance parameters.

6. The industrial plant of claim 1, wherein optimizing, based on the site-level constraints and the multi-site constraints, the equipment operating parameters for the respective power generation equipment comprises:

generating a global matrix that comprises site-level optimization results of each energy system; and using a global objective function and the global matrix of site-level optimization results to optimize the equipment operating parameters for the respective power generation equipment.

7. The industrial plant of claim 1, wherein the equipment operating parameters comprise cogeneration load management and boilers load management.

8. The industrial plant of claim 1, wherein the operations further comprise:

displaying, via a user interface, the equipment operating parameters on a display device; and displaying, via the user interface, benefits associated with the equipment operating parameters on the display device.

9. A computer system for an industrial plant, the computer system managing a plurality of energy systems located in a plurality of facilities, the computer system comprising:

one or more processors configured to perform operations comprising:

for each energy system of the plurality of energy systems at each facility of the plurality of facilities:

receiving, from one or more sensors a respective power generation equipment included in a respective energy system, equipment operating parameters;

performing equipment level data validation for the respective power generation equipment by processing the equipment operating parameters relative to an operational status of the respective power generation equipment, to generate validated equipment level data;

performing equipment level data reconciliation for the respective power generation equipment by processing the validated equipment level data relative to acceptable equipment level ranges, to generate reconciled equipment level data; and performing site-level optimization, using the reconciled equipment level data, to determine calibrated equipment operating parameters for the respective power generation equipment;

determining: (i) site-level constraints for the plurality of energy systems, and (ii) multi-site constraints across the plurality of energy systems; and updating, by activating equipment switches, operational states of one or more power generation equipment for optimizing, based on the site-level constraints and the multi-site constraints, the calibrated equipment operating parameters for the respective power generation equipment across the plurality of energy systems.

10. The computer system of claim 9, wherein the plurality of energy systems comprise an industrial plant, a power generation plant, and a renewable energy plant.

11. The computer system of claim 9, wherein the site-level constraints comprise energy demands of each energy system, a respective steam reserve for each energy system, a respective minimum number of boilers needed to maintain the respective steam reserve for each energy system, and equipment limitations of the respective power generation equipment for each energy system.

12. The computer system of claim 9, wherein the multi-site constraints comprise a steam reserve requirement across the plurality of energy systems, a power reserve requirement across the plurality of energy systems, an emission reduction target across the plurality of energy systems, and a minimum efficiency across the plurality of energy systems.

13. The computer system of claim 9, wherein performing equipment level data validation for the respective power generation equipment comprises:

for each equipment of the plurality of power generation equipment:

receiving, during operation of each equipment, measured operational physical parameter values output by the equipment during the operation of the equipment;

determining, using the received operational physical parameter values, mass balance and energy balance parameters associated with the equipment; and validating an operation of the equipment using the determined mass balance and energy balance parameters.

14. The computer system of claim 9, wherein optimizing, based on the site-level constraints and the multi-site constraints, the equipment operating parameters for the respective power generation equipment comprises:

generating a global matrix that comprises site-level optimization results of each energy system; and using a global objective function and the global matrix of site-level optimization results to optimize the equipment operating parameters for the respective power generation equipment.

15. The computer system of claim 9, wherein the equipment operating parameters comprise cogeneration load management and boilers load management.

16. The computer system of claim 9, the operations further comprising:

displaying, via a user interface, the equipment operating parameters on a display device; and displaying, via the user interface, benefits associated with the equipment operating parameters on the display device.

17. A non-transitory computer storage medium encoded with instructions that, when executed by one or more computers managing a plurality of energy systems located in multiple facilities and comprising a respective power generation equipment, cause the one or more computers to perform operations comprising:

for each energy system of the plurality of energy systems at each facility of the plurality of facilities:

receiving, from one or more sensors a respective power generation equipment included in a respective energy system, equipment operating parameters;

performing equipment level data validation for the respective power generation equipment by processing the equipment operating parameters relative to an operational status of the respective power generation equipment, to generate validated equipment level data;

performing equipment level data reconciliation for the respective power generation equipment by processing the validated equipment level data relative to acceptable equipment level ranges, to generate reconciled equipment level data; and performing site-level optimization, using the reconciled equipment level data, to determine calibrated equipment operating parameters for the respective power generation equipment;

determining: (i) site-level constraints for the plurality of energy systems, and (ii) multi-site constraints across the plurality of energy systems; and updating, by activating equipment switches, operational states of one or more power generation equipment for optimizing, based on the site-level constraints and the multi-site constraints, the calibrated equipment operating parameters for the respective power generation equipment across the plurality of energy systems.

18. The non-transitory computer storage medium of claim 17, wherein the plurality of energy systems comprise an industrial plant, a power generation plant, and a renewable energy plant.

19. The non-transitory computer storage medium of claim 17, wherein the site-level constraints comprise energy demands of each energy system, a respective steam reserve for each energy system, a respective minimum number of boilers needed to maintain the respective steam reserve for each energy system, and equipment limitations of the respective power generation equipment for each energy system.

20. The non-transitory computer storage medium of claim 17, wherein the multi-site constraints comprise a steam reserve requirement across the plurality of energy systems, a power reserve requirement across the plurality of energy systems, an emission reduction target across the plurality of energy systems, and a minimum efficiency across the plurality of energy systems.

* * * * *